United States Patent
Matsubara et al.

(10) Patent No.: US 11,279,338 B2
(45) Date of Patent: Mar. 22, 2022

(54) CONTROL DEVICE FOR HYBRID VEHICLE

(71) Applicant: TOYOTA JIDOSHA KABUSHIKI KAISHA, Toyota (JP)

(72) Inventors: Tooru Matsubara, Toyota (JP); Atsushi Tabata, Okazaki (JP); Koichi Okuda, Toyota (JP); Yasuhiro Hiasa, Miyoshi (JP); Takashi Kohno, Tokai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 8 days.

(21) Appl. No.: 17/017,616

(22) Filed: Sep. 10, 2020

(65) Prior Publication Data

US 2021/0107445 A1 Apr. 15, 2021

(30) Foreign Application Priority Data

Oct. 11, 2019 (JP) .............................. JP2019-188228

(51) Int. Cl.
*B60W 10/08* (2006.01)
*B60W 20/17* (2016.01)
*B60W 10/06* (2006.01)

(52) U.S. Cl.
CPC ............ *B60W 10/08* (2013.01); *B60W 10/06* (2013.01); *B60W 20/17* (2016.01); *B60W 2400/00* (2013.01); *B60Y 2200/92* (2013.01)

(58) Field of Classification Search
CPC ...... B60W 10/08; B60W 10/06; B60W 20/17; B60W 2400/00; B60W 2050/0026; B60W 2510/0638; B60W 2510/0657; B60W 2510/244; B60W 20/11; B60W 2540/215; B60W 30/182; B60W 10/101; B60W 10/26; B60W 20/00; B60W 30/1882; B60K 6/383; B60K 6/547; B60K 6/24; B60K 6/365; B60K 2006/381; B60K 6/387; B60K 6/445
See application file for complete search history.

(56) References Cited

U.S. PATENT DOCUMENTS

| 2016/0264124 | A1* | 9/2016 | Hotta | B60K 6/445 |
| 2018/0056978 | A1* | 3/2018 | Hata | B60W 10/06 |
| 2019/0118796 | A1* | 4/2019 | Mizuno | B60K 6/442 |

FOREIGN PATENT DOCUMENTS

JP 2010-138751 A 6/2010

\* cited by examiner

*Primary Examiner* — David J Hlavka
(74) *Attorney, Agent, or Firm* — Hunton Andrews Kurth LLP

(57) ABSTRACT

A control device for a hybrid vehicle includes an engine operating point control unit that shifts an engine operating point to an engine operating point on an optimal fuel-efficiency operating line outside a predetermined noise generation region in which combustion sounds of an engine become noise when the engine operating point is in the noise generation region. Accordingly, when the engine operating point is in the noise generation region, the engine operating point control unit shifts the engine operating point to an engine operating point on the optimal fuel-efficiency operating line outside the noise generation region. As a result, since the engine operating point is not separated from the optimal fuel-efficiency operating line even when the engine operating point departs from the noise generation region, it is possible to curb a decrease in fuel efficiency.

5 Claims, 9 Drawing Sheets

| TRAVEL MODE | | | | C1 | B1 | MG1 | MG2 |
|---|---|---|---|---|---|---|---|
| EV | FORWARD/ REVERSE | SINGLE-MOTOR DRIVE | DRIVE | | | G | M |
| | | | USE IN COMBINATION WITH ENGINE BRAKE | △ | △ | G | M |
| | | TWO-MOTOR DRIVE | | ○ | ○ | M | M |
| HV | FORWARD | HIGH | | | ○ | G | M |
| | | LOW | | ○ | | G | M |
| | REVERSE | LOW | | ○ | | G | M |

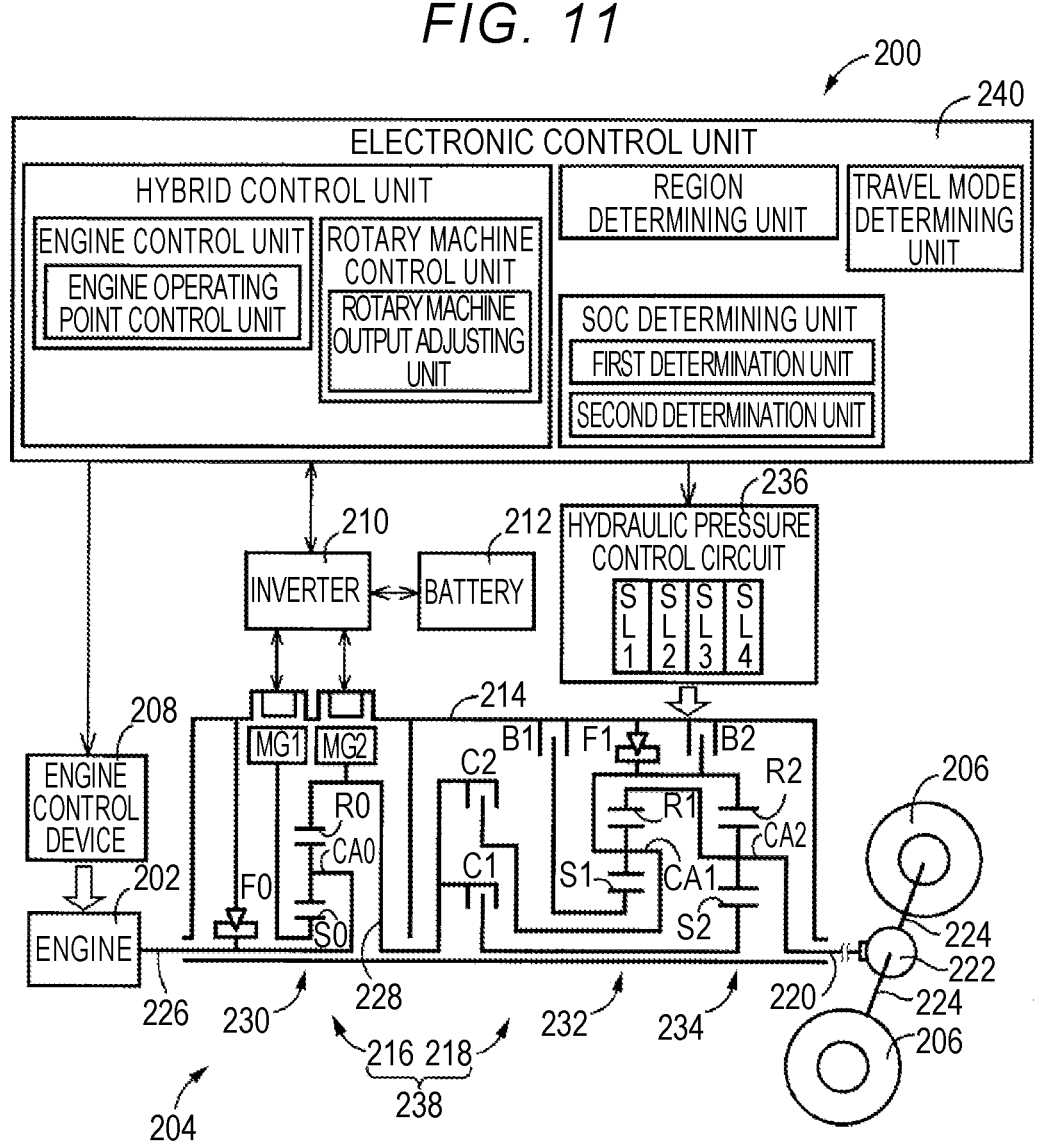

CONTROL DEVICE FOR HYBRID VEHICLE

CROSS-REFERENCE TO RELATED APPLICATION

This application claims priority to Japanese Patent Application No. 2019-188228 filed on Oct. 11, 2019, incorporated herein by reference in its entirety.

BACKGROUND

1. Technical Field

The disclosure relates to a control device for a hybrid vehicle using an engine and a rotary machine as drive power sources for travel.

2. Description of Related Art

A hybrid vehicle using an engine and a rotary machine as drive power sources for travel is known. An example thereof is a vehicle described in Japanese Unexamined Patent Application Publication 2010-138751 (JP 2010-138751 A). JP 2010-138751 A proposes controlling an operating point of the engine such that the operating point reaches an operating point on a predetermined optimal fuel-efficiency operating line based on a required output required of the engine and curbing generation of noise by causing the operating point of the engine to depart from a region in which combustion sounds of the engine or the like become noise, for example, when the operating point of the engine is in the region.

SUMMARY

However, in JP 2010-138751 A, when the operating point of the engine is in the region, the operating point of the engine is shifted to an operating point which is separated from the optimal fuel-efficiency operating line outside the region and thus there is a problem with a decrease in fuel efficiency.

The disclosure provides a control device for a hybrid vehicle that can curb a decrease in fuel efficiency.

According to a first aspect of the disclosure, there is provided (a) a control device for a hybrid vehicle including an engine and a rotary machine as drive power sources for travel, the control device including: (b) an engine operating point control unit configured to control an operating point of the engine such that the operating point of the engine reaches an operating point on a predetermined optimal fuel-efficiency operating line based on a required output required of the engine and to shift the operating point of the engine to an operating point on the optimal fuel-efficiency operating line outside a predetermined region in which combustion sounds of the engine become noise when the operating point of the engine is in the predetermined region; and (c) a rotary machine output adjusting unit configured to adjust an output of the rotary machine to compensate for a difference between the output of the engine and the required output due to the shifting of the operating point of the engine.

A second aspect of the disclosure provides the control device for the hybrid vehicle according to the first aspect, wherein (a) the hybrid vehicle includes a plurality of travel modes including a fuel efficiency priority mode in which priority is given to an increase in fuel efficiency, and (b) the engine operating point control unit is configured to shift the operating point of the engine to an operating point on the optimal fuel-efficiency operating line outside the region when the operating point of the engine is in the region and the fuel efficiency priority mode is selected as the travel mode and to shift the operating point of the engine to an operating point on an engine rotation speed contour line in which an engine rotation speed is the same as an engine rotation speed of an operating point in the region outside the region when the fuel efficiency priority mode is not selected as the travel mode.

A third aspect of the disclosure provides the control device for the hybrid vehicle according to the first or second aspect, wherein (a) the hybrid vehicle includes a power storage device that transmits and receives electric power to and from the rotary machine, and (b) the engine operating point control unit is configured to shift the operating point of the engine to an operating point on a side on which the output of the engine is increased outside the region when the operating point of the engine is in the region and a state of charge value of the power storage device is equal to or less than a predetermined lower-limit threshold value.

A fourth aspect of the disclosure provides the control device for the hybrid vehicle according to any one of the first to third aspects, wherein (a) the hybrid vehicle includes a power storage device that transmits and receives electric power to and from the rotary machine, and (b) the engine operating point control unit is configured to shift the operating point of the engine to an operating point on a side on which the output of the engine is decreased outside the region when the operating point of the engine is in the region and a state of charge value of the power storage device is equal to or greater than a predetermined upper-limit threshold value.

A fifth aspect of the disclosure provides the control device for the hybrid vehicle according to any one of the first to fourth aspects, wherein the engine operating point control unit is configured to shift the operating point of the engine to an operating point on the optimal fuel-efficiency operating line outside the region when a noise duration time in which the operating point of the engine stays in the region is longer than a predetermined time which is determined in advance and to control the operating point of the engine such that the operating point of the engine reaches an operating point on the optimal fuel-efficiency operating line based on the required output when the noise duration time is equal to or shorter than the predetermined time.

With the control device for the hybrid vehicle according to the first aspect of the disclosure, when the operating point of the engine is in the region, the engine operating point control unit shifts the operating point of the engine to an operating point on the optimal fuel-efficiency operating line outside the region. As a result, since the engine operating point is not separated from the optimal fuel-efficiency operating line even when the operating point of the engine departs from the region, it is possible to curb a decrease in fuel efficiency.

With the control device for the hybrid vehicle according to the second aspect of the disclosure, when the fuel efficiency priority mode is selected, the engine operating point control unit curbs separation of the operating point of the engine from the optimal fuel-efficiency operating line even when the operating point of the engine departs from the region, and thus it is possible to curb a decrease in fuel efficiency. When the fuel efficiency priority mode is not selected, the engine operating point control unit does not change the engine rotation speed at the operating point in the region even when the operating point of the engine is shifted, and thus it is possible to appropriately curb deterioration in drive feeling due to the change of the engine rotation speed.

With the control device for the hybrid vehicle according to the third aspect of the disclosure, when the state of charge value is equal to or less than the lower-limit threshold value, the engine operating point control unit shifts the operating point of the engine to an operating point on the side on which the output of the engine is increased outside the region, and thus it is possible to increase the state of charge value by increasing an amount of charged electric power using an output corresponding to the increase in the output of the engine. Accordingly, the engine operating point control unit can appropriately shift the operating point of the engine based on the state of charge value of the power storage device.

With the control device for the hybrid vehicle according to the fourth aspect of the disclosure, when the state of charge value is equal to or greater than the upper-limit threshold value, the engine operating point control unit shifts the operating point of the engine to an operating point on the side on which the output of the engine is decreased outside the region, and thus it is possible to decrease the state of charge value by increasing an amount of discharged electric power to compensate for an output corresponding to the decrease in the output of the engine. Accordingly, the engine operating point control unit can appropriately shift the operating point of the engine based on the state of charge value of the power storage device.

With the control device for the hybrid vehicle according to the fifth aspect of the disclosure, when the noise duration time is longer than the predetermined time, the engine operating point control unit shifts the operating point of the engine. Accordingly, for example, in comparison with a case in which the operating point of the engine is shifted when the operating point of the engine is in the region, it is possible to curb excessive shift of the operating point of the engine.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 11 is a diagram schematically illustrating a configuration of a vehicle to which the disclosure is applied and which is different from the vehicle illustrated in FIG. 1;

FIG. 12 is an operation table illustrating a relationship between a gear shifting operation of a mechanical stepped gear shifting unit illustrated in FIG. 11 and a combination of operations of engagement devices which are used therein.

DETAILED DESCRIPTION OF EMBODIMENTS

Hereinafter, embodiments of the disclosure will be described in detail with reference to the accompanying drawings.

Figure 1:
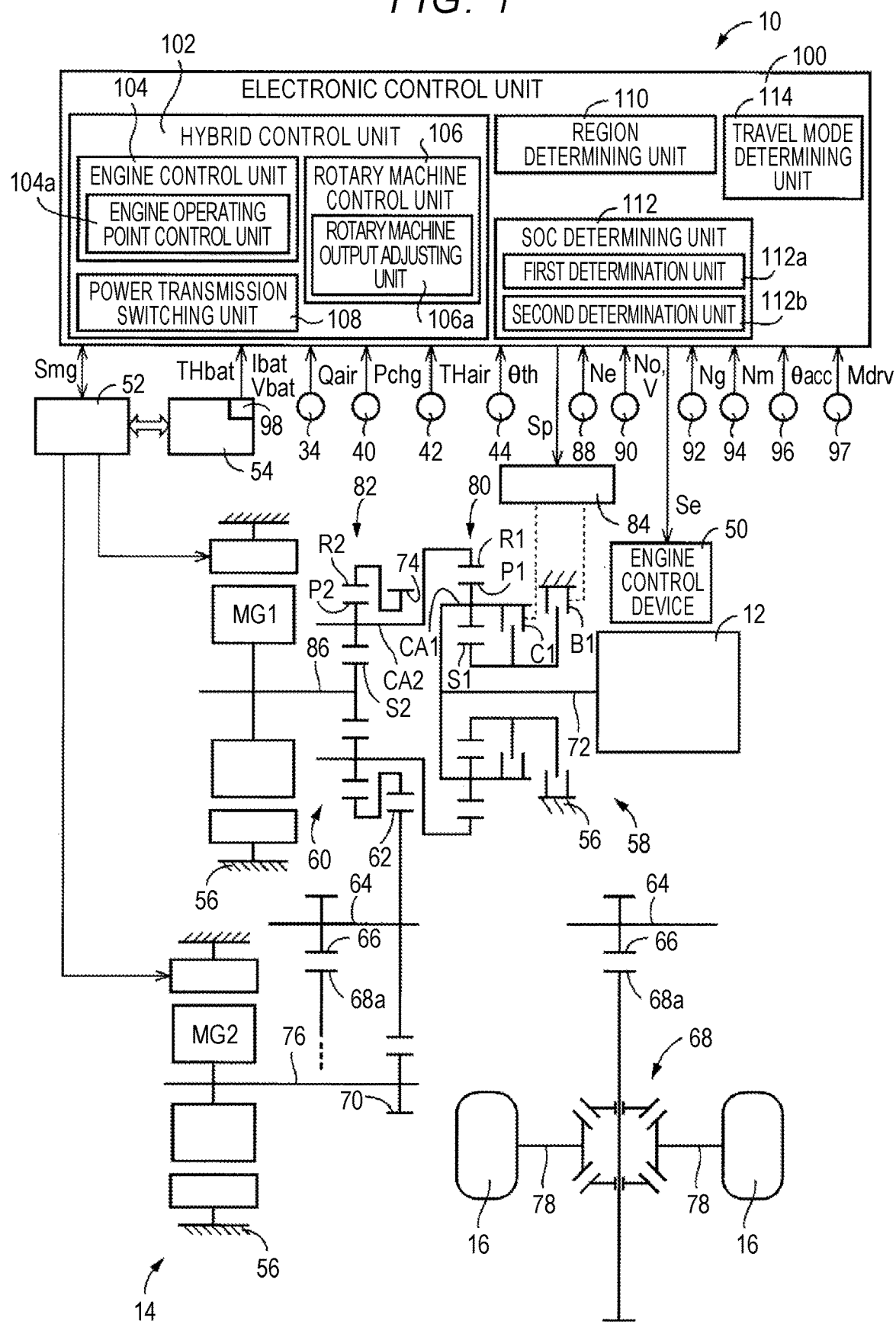
FIG. 1 is a diagram schematically illustrating a configuration of a vehicle to which the disclosure is applied and illustrating principal parts of a control function and a control system for various types of control in the vehicle.

FIG. 1 is a diagram schematically illustrating a configuration of a vehicle 10 to which the disclosure is applied and illustrating principal parts of a control function and a control system for various types of control in the vehicle 10. In FIG. 1, the vehicle 10 is a hybrid vehicle that includes an engine 12, a first rotary machine MG1, a second rotary machine (a rotary machine) MG2, a power transmission device 14, and driving wheels 16. The vehicle 10 is a hybrid vehicle including the engine 12 and the second rotary machine MG2 as drive power sources for travel.

Figure 2:
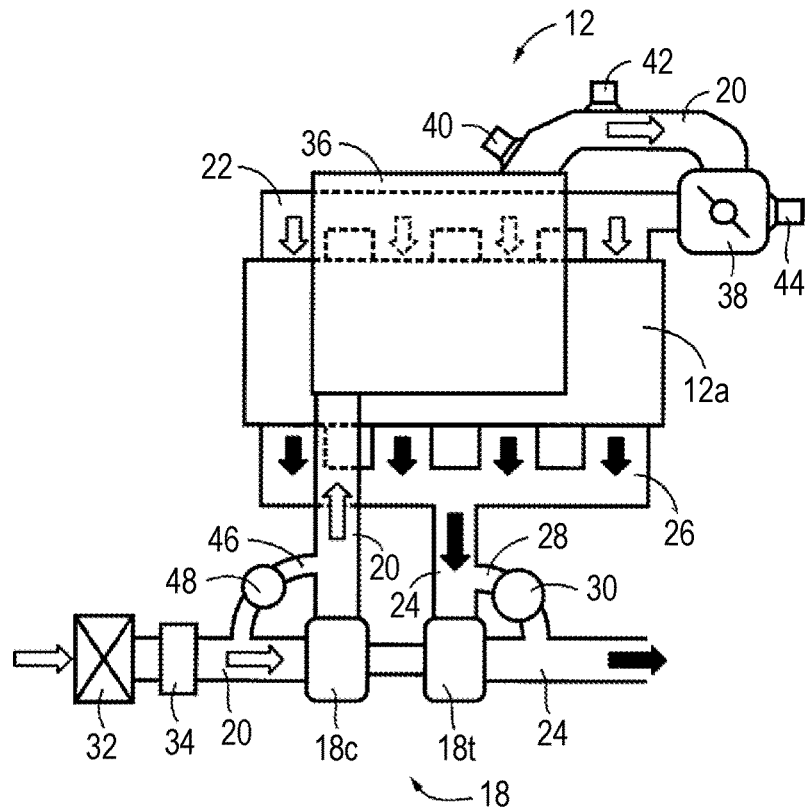
FIG. 2 is a diagram schematically illustrating a configuration of an engine.

FIG. 2 is a diagram schematically illustrating a configuration of the engine 12. In FIG. 2, the engine 12 is a power source for travel of the vehicle 10 and is a known internal combustion engine such as a gasoline engine or a diesel engine including a supercharger 18, that is, an engine with the supercharger 18. An intake pipe 20 is provided in an intake system of the engine 12 and the intake pipe 20 is connected to an intake manifold 22 which is attached to an engine body 12a. An exhaust pipe 24 is provided in an exhaust system of the engine 12 and the exhaust pipe 24 is connected to an exhaust manifold 26 which is attached to the engine body 12a. The supercharger 18 is a known exhaust turbine type supercharger, that is, a turbocharger, including a compressor 18c that is provided in the intake pipe 20 and a turbine 18t that is provided in the exhaust pipe 24. The turbine 18t is rotationally driven by exhaust gas, that is, a flow of exhaust gas. The compressor 18c is connected to the turbine 18t and is rotationally driven by the turbine 18t to compress air suctioned to the engine 12, that is, intake air.

An exhaust bypass 28 that causes exhaust gas to flow from upstream to downstream with respect to the turbine 18t by bypassing the turbine 18t is provided in parallel in the exhaust pipe 24. A waste gate valve (=WGV) 30 that continuously controls a ratio of exhaust gas passing through the exhaust bypass 28 to exhaust gas passing through the turbine 18t is provided in the exhaust bypass 28. A valve opening amount of the waste gate valve 30 is continuously adjusted by causing an electronic control unit (a control device) 100 which will be described later to operate an actuator which is not illustrated. As the valve opening amount of the waste gate valve 30 increases, exhaust gas of the engine 12 is more likely to be discharged via the exhaust bypass 28. Accordingly, in a supercharged state of the engine 12 in which a supercharging operation of the supercharger 18 works, a supercharging pressure Pchg from the supercharger 18 decreases as the valve opening amount of the waste gate valve 30 increases. The supercharging pressure Pchg from the supercharger 18 is a pressure of intake air and is an air pressure downstream from the compressor 18c in the intake pipe 20. A side on which the supercharging pressure Pchg is low is, for example, a side with a pressure of intake air in a non-supercharged state of the engine 12 in which the supercharging operation of the supercharger 18 does not work at all, that is, a side with a pressure of intake air in an engine without the supercharger 18.

An air cleaner 32 is provided in an inlet of the intake pipe 20, and an air flowmeter 34 that measures an amount of intake air Qair of the engine 12 is provided in the intake pipe 20 downstream from the air cleaner 32 and upstream from the compressor 18c. An intercooler 36 which is a heat exchanger that cools intake air compressed by the supercharger 18 by exchanging heat between intake air and outside air or a coolant is provided in the intake pipe 20 downstream from the compressor 18c. An electronic throttle valve 38 of which opening amount and closing are controlled by causing the electronic control unit 100 which will be described later to operate a throttle actuator which is not illustrated is provided in the intake pipe 20 downstream from the intercooler 36 and upstream from the intake manifold 22. A supercharging pressure sensor 40 that detects the supercharging pressure Pchg from the supercharger 18 and an intake air temperature sensor 42 that detects an intake air temperature THair which is the temperature of intake air are provided in the intake pipe 20 between the intercooler 36 and the electronic throttle valve 38. A throttle valve opening amount sensor 44 that detects a throttle valve opening amount θth which is an opening amount of the electronic throttle valve 38 is provided in the vicinity of the electronic throttle valve 38, for example, in the throttle actuator.

An air recirculation bypass 46 that recirculates air from downstream to upstream with respect to the compressor 18c by bypassing the compressor 18c is provided in parallel in the intake pipe 20. For example, an air bypass valve (=ABV) 48 that opens at the time of sudden closing of the electronic throttle valve 38 such that occurrence of surge is curbed to protect the compressor 18c is provided in the air recirculation bypass 46.

In the engine 12, an engine torque Te which is an output torque of the engine 12 is controlled by causing the electronic control unit 100 which will be described later to control an engine control device 50 (see FIG. 1) including the electronic throttle valve 38, a fuel injection device, an ignition device, and the waste gate valve 30.

Referring back to FIG. 1, the first rotary machine MG1 and the second rotary machine MG2 are electric rotary machines having a function of an electric motor (a motor) and a function of a power generator (a generator) and are so-called motor generators. The first rotary machine MG1 and the second rotary machine MG2 can serve as a power source for travel of the vehicle 10. The first rotary machine MG1 and the second rotary machine MG2 are connected to a battery 54 which is provided in the vehicle 10 via an inverter 52 which is provided in the vehicle 10. In the first rotary machine MG1 and the second rotary machine MG2, an MG1 torque Tg which is an output torque of the first rotary machine MG1 and an MG2 torque Tm which is an output torque of the second rotary machine MG2 are controlled by causing the electronic control unit 100 which will be described later to control the inverter 52. For example, in the case of forward rotation, an output torque of a rotary machine is a powering torque which is a positive torque on an acceleration side and is a regenerative torque which is a negative torque on a deceleration side. The battery 54 is a power storage device that transmits and receives electric power to and from the first rotary machine MG1 and the second rotary machine MG2. The first rotary machine MG1 and the second rotary machine MG2 are provided in a case 56 which is a non-rotary member attached to the vehicle body.

The power transmission device 14 includes a gear shifting unit 58, a differential unit 60, a driven gear 62, a driven shaft 64, a final gear 66, a differential gear 68, and a reduction gear 70 in the case 56. The gear shifting unit 58 and the differential unit 60 are arranged coaxially with an input shaft 72 which is an input rotary member of the gear shifting unit 58. The gear shifting unit 58 is connected to the engine 12 via the input shaft 72 or the like. The differential unit 60 is connected in series to the gear shifting unit 58. The driven gear 62 engages with a drive gear 74 which is an output rotary member of the differential unit 60. The driven shaft 64 fixes the driven gear 62 and the final gear 66 such that they cannot rotate relative to each other. The final gear 66 has a smaller diameter than the driven gear 62. The differential gear 68 engages with the final gear 66 via a differential ring gear 68a. The reduction gear 70 has a smaller diameter than the driven gear 62 and engages with the driven gear 62. A rotor shaft 76 of the second rotary machine MG2 which is disposed in parallel with the input shaft 72 is connected to the reduction gear 70 separately from the input shaft 72 and the reduction gear 70 is connected to the second rotary machine MG2 in a power-transmittable manner. The power transmission device 14 includes an axle 78 that is connected to the differential gear 68.

The power transmission device 14 having this configuration is suitably used for a vehicle of a front-engine front-drive (FF) type or a rear-engine rear-drive (RR) type. In the power transmission device 14, power which is output from the engine 12, the first rotary machine MG1, and the second rotary machine MG2 is transmitted to the driven gear 62 and is transmitted from the driven gear 62 to the driving wheels 16 sequentially via the final gear 66, the differential gear 68, the axle 78, and the like. In this way, the second rotary machine MG2 is a rotary machine that is connected to the driving wheels 16 in a power-transmittable manner. In the power transmission device 14, the engine 12, the gear shifting unit 58, the differential unit 60, the first rotary machine MG1, and the second rotary machine MG2 are arranged on different axes, whereby a shaft length is decreased. A reduction gear ratio of the second rotary machine MG2 can be set to be great. Power is synonymous with torque or force when not particularly distinguished.

The gear shifting unit 58 includes a first planetary gear mechanism 80, a clutch C1, and a brake B1. The differential unit 60 includes a second planetary gear mechanism 82. The first planetary gear mechanism 80 is a known single-pinion type planetary gear device including a first sun gear S1, a first pinion P1, a first carrier CA1 that supports the first pinion P1 such that it can rotate and revolve, and a first ring gear R1 that engages with the first sun gear S1 via the first pinion P1. The second planetary gear mechanism 82 is a known single-pinion type planetary gear device including a second sun gear S2, a second pinion P2, a second carrier CA2 that supports the second pinion P2 such that it can rotate and revolve, and a second ring gear R2 that engages with the second sun gear S2 via the second pinion P2.

In the first planetary gear mechanism 80, the first carrier CA1 is a rotary element that is integrally connected to the input shaft 72 and connected to the engine 12 via the input shaft 72 in a power-transmittable manner. The first sun gear S1 is a rotary element that is selectively connected to the case 56 via the brake B1. The first ring gear R1 is a rotary element that is connected to the second carrier CA2 of the second planetary gear mechanism 82 which is an input rotary member of the differential unit 60 and serves as an output rotary member of the gear shifting unit 58. The first carrier CA1 and the first sun gear S1 are selectively connected to each other via the clutch C1.

The clutch C1 and the brake B1 are wet frictional engagement devices and are multi-disc hydraulic frictional engagement devices of which engagement is controlled by a hydraulic actuator. In the clutch C1 and the brake B1, operating states such as an engaged state and a disengaged state are switched between based on regulated hydraulic pressures Pc1 and Pb1 which are output from a hydraulic pressure control circuit 84 provided in the vehicle 10 by causing the electronic control unit 100 which will be described later to control the hydraulic pressure control circuit 84 provided in the vehicle 10.

In a state in which both the clutch C1 and the brake B1 are disengaged, a differential operation of the first planetary gear mechanism 80 is permitted. Accordingly, in this state, since a reaction torque of the engine torque Te does not appear in the first sun gear S1, the gear shifting unit 58 is in a neutral state in which mechanical power transmission is not possible, that is, a neutral state. In a state in which the clutch C1 is engaged and the brake B1 is disengaged, the rotary elements of the first planetary gear mechanism 80 rotate integrally. Accordingly, in this state, rotation of the engine 12 is transmitted from the first ring gear R1 to the second carrier CA2 at a constant speed. On the other hand, in a state in which the clutch C1 is disengaged and the brake B1 is engaged, rotation of the first sun gear S1 of the first planetary gear mechanism 80 is prohibited and rotation of the first ring gear R1 is increased to be greater than rotation of the first carrier CA1. Accordingly, in this state, rotation of the engine 12 is increased and output from the first ring gear R1. In this way, the gear shifting unit 58 serves as a two-stage stepped transmission which is switched, for example, between a low gear stage in a directly coupled state with a gear ratio of "1.0" and a high gear stage in an overdrive state with a gear ratio of "0.7." In a state in which both the clutch C1 and the brake B1 are engaged, rotation of the rotary elements of the first planetary gear mechanism 80 is prohibited. Accordingly, in this state, rotation of the first ring gear R1 which is the output rotary member of the gear shifting unit 58 is stopped and thus rotation of the second carrier CA2 which is the input rotary member of the differential unit 60 is stopped.

In the second planetary gear mechanism 82, the second carrier CA2 is a rotary element that is connected to the first ring gear R1 which is the output rotary member of the gear shifting unit 58 and serves as an input rotary member of the differential unit 60. The second sun gear S2 is a rotary element that is integrally connected to the rotor shaft 86 of the first rotary machine MG1 and is connected to the first rotary machine MG1 in a power-transmittable manner. The second ring gear R2 is a rotary element that is integrally connected to the drive gear 74 and is connected to the driving wheels 16 in a power-transmittable manner and serves as an output rotary member of the differential unit 60.

The second planetary gear mechanism 82 is a power split mechanism that mechanically splits power of the engine 12 which is input to the second carrier CA2 via the gear shifting unit 58 to the first rotary machine MG1 and the drive gear 74. That is, the second planetary gear mechanism 82 is a differential mechanism that splits and transmits power of the engine 12 to the driving wheels 16 and the first rotary machine MG1. In the second planetary gear mechanism 82, the second carrier CA2 serves as an input element, the second sun gear S2 serves as a reaction element, and the second ring gear R2 serves as an output element. The differential unit 60 constitutes an electrical gear shifting mechanism, for example, an electrical stepless transmission, in which a differential state of the second planetary gear mechanism 82 is controlled by controlling the operating state of the first rotary machine MG1 along with the first rotary machine MG1 that is connected to the second planetary gear mechanism 82 in a power-transmittable manner. The first rotary machine MG1 is a rotary machine to which power of the engine 12 is transmitted. Since the gear shifting unit 58 is in an overdrive state, an increase in torque of the first rotary machine MG1 is curbed. Controlling the operating state of the first rotary machine MG1 refers to performing operation control of the first rotary machine MG1.

Figure 3:
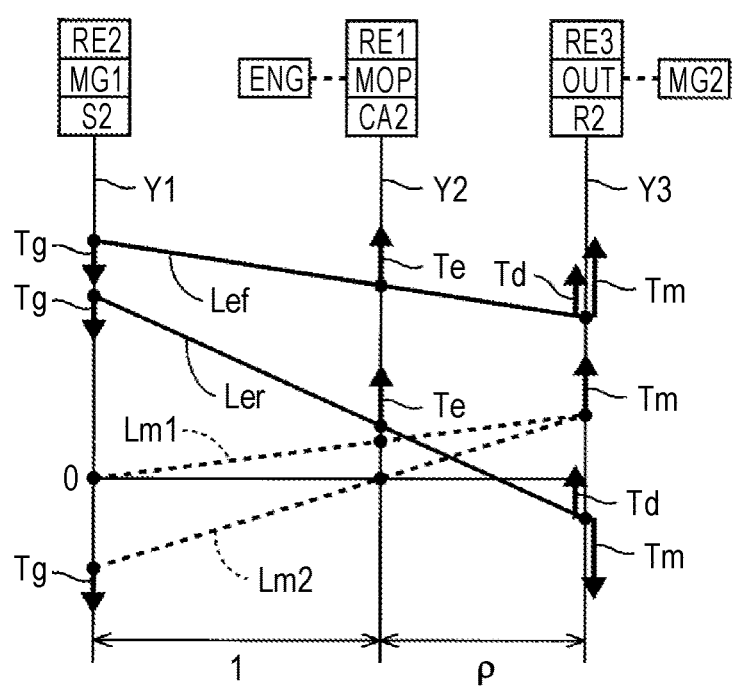
FIG. 3 is a collinear diagram illustrating a relative relationship between rotation speeds of rotary elements in a differential unit.

FIG. 3 is a collinear diagram illustrating rotation speeds of the rotary elements in the differential unit 60 relative to each other. In FIG. 3, three vertical lines Y1, Y2, and Y3 correspond to three rotary elements of the second planetary gear mechanism 82 constituting the differential unit 60. The vertical line Y1 represents the rotation speed of the second sun gear S2 which is a second rotary element RE2 connected to the first rotary machine MG1 (see "MG1" in the drawing). The vertical line Y2 represents the rotation speed of the second carrier CA2 which is a first rotary element RE1 connected to the engine 12 (see "ENG" in the drawing) via the gear shifting unit 58. The vertical line Y3 represents the rotation speed of the second ring gear R2 which is a third rotary element RE3 integrally connected to the drive gear 74 (see "OUT" in the drawing). The second rotary machine MG2 (see "MG2" in the drawing) is connected to the driven gear 62 engaging with the drive gear 74 via the reduction gear 70 or the like. A mechanical oil pump (see "MOP" in the drawing) which is provided in the vehicle 10 is connected to the second carrier CA2. This mechanical oil pump is operated with rotation of the second carrier CA2 to supply oil which is used for engaging operations of the clutch C1 and the brake B1, lubrication of the parts, and cooling of the parts. When rotation of the second carrier CA2 is stopped, the oil is supplied by an electrical oil pump (not illustrated) which is provided in the vehicle 10. The gaps between the vertical lines Y1, Y2, and Y3 are determined according to a gear ratio ρ (=number of teeth of the sun gear/number of teeth of the ring gear) of the second planetary gear mechanism 82. In the relationship between the vertical axes in the collinear diagram, when the gap between a sun gear and a carrier corresponds to "1," the gap between the carrier and a ring gear corresponds to the gear ratio ρ.

A solid line Lef in FIG. 3 denotes an example of relative speeds of the rotary elements at the time of forward travel in an HV travel mode which is a travel mode in which hybrid travel (=HV travel) using at least the engine 12 as a power source is possible. A solid line Ler in FIG. 3 denotes an example of relative speeds of the rotary elements at the time of reverse travel in the HV travel mode. In the HV travel mode, in the second planetary gear mechanism 82, for example, when an MG1 torque Tg which is a reaction torque and a negative torque of the first rotary machine MG1 with respect to an engine torque Te that is a positive torque which is input to the second carrier CA2 via the gear shifting unit 58 is input to the second sun gear S2, a direct engine-transmitted torque Td which is a positive torque appears in the second ring gear R2. For example, when the MG1 torque Tg ($=-\rho/(1+\rho)\times$Te) which is a reaction torque with respect to the engine torque Te that is input to the second carrier CA2 is input to the second sun gear S2 in a state in which the clutch C1 is engaged, the brake B1 is disengaged, and the gear shifting unit 58 is in a directly coupled state with a gear ratio of "1.0," a direct engine-transmitted torque Td ($=$Te/$(1+\rho)=-(1/\rho)\times$Tg) appears in the second ring gear R2. A combined torque of the direct engine-transmitted torque Td and the MG2 torque Tm which are transmitted to the driven gear 62 can be transmitted as a drive torque of the vehicle 10 to the driving wheels 16 according to required drive power. The first rotary machine MG1 serves as a power generator when a negative torque is generated at the time of positive rotation. Generated electric power Wg of the first rotary machine MG1 is charged into the battery 54 or is consumed in the second rotary machine MG2. The second rotary machine MG2 outputs the MG2 torque Tm using all or some of the generated electric power Wg or using electric power from the battery 54 in addition to the generated electric power Wg. The MG2 torque Tm at the time of forward travel is a powering torque which is a positive torque at the time of forward rotation, and the MG2 torque Tm at the time of reverse travel is a powering torque which is a negative torque at the time of reverse rotation.

The differential unit 60 can operate as an electrical stepless transmission. For example, in the HV travel mode, when the rotation speed of the first rotary machine MG1, that is, the rotation speed of the second sun gear S2, is increased or decreased by controlling the operating state of the first rotary machine MG1 with respect to an output rotation speed No which is the rotation speed of the drive gear 74 which is constrained on rotation of the driving wheels 16, the rotation speed of the second carrier CA2 increases or decreases. Since the second carrier CA2 is connected to the engine 12 via the gear shifting unit 58, an engine rotation speed Ne which is the rotation speed of the engine 12 increases or decreases with the increase or decrease in the rotation speed of the second carrier CA2. Accordingly, in the HV travel, it is possible to perform control such that an engine operating point (an operating point) OPeng is set to an efficient operating point. This hybrid type is referred to as a mechanical split type or a split type. The first rotary machine MG1 is a rotary machine that can control an engine rotation speed Ne, that is, a rotary machine that can adjust an engine rotation speed Ne. An operating point is an operating point which is expressed by a rotation speed and a torque, and the engine operating point OPeng is an operating point of the engine 12 which is expressed by the engine rotation speed Ne and the engine torque Te.

A dotted line Lm1 in FIG. 3 represents an example of relative speeds of the rotary elements at the time of forward travel in a single-motor-driven EV mode in which motor-driven travel using only the second rotary machine MG2 as a power source is possible in motor-driven travel ($=$EV travel) mode. A dotted line Lm2 in FIG. 3 represents an example of relative speeds of the rotary elements at the time of forward travel in a double-motor-driven EV mode in which motor-driven travel using both the first rotary machine MG1 and the second rotary machine MG2 as power sources is possible in the EV travel mode. The EV travel mode is a travel mode in which motor-driven travel using at least one of the first rotary machine MG1 and the second rotary machine MG2 as a power source in a state in which the operation of the engine 12 is stopped is possible.

In the single-motor-driven EV mode, when both the clutch C1 and the brake B1 are disengaged and the gear shifting unit 58 falls into a neutral state, the differential unit 60 also falls into a neutral state. In this state, the MG2 torque Tm can be transmitted as a drive torque of the vehicle 10 to the driving wheels 16. In the single-motor-driven EV mode, for example, the first rotary machine MG1 is maintained at zero rotation in order to reduce a drag loss in the first rotary machine MG1. For example, even when control is performed such that the first rotary machine MG1 is maintained at zero rotation, the differential unit 60 is in the neutral state and thus the drive torque is not affected.

In the double-motor-driven EV mode, when both the clutch C1 and the brake B1 are engaged and rotation of the rotary elements of the first planetary gear mechanism 80 is prohibited, the second carrier CA2 is stopped at zero rotation. In this state, the MG1 torque Tg and the MG2 torque Tm can be transmitted as the drive torque of the vehicle 10 to the driving wheels 16.

Referring back to FIG. 1, the vehicle 10 further includes an electronic control unit 100 serving as a controller including the control device for the vehicle 10 associated with control of the engine 12, the first rotary machine MG1, the second rotary machine MG2, and the like. For example, the electronic control unit 100 is configured to include a so-called microcomputer including a CPU, a RAM, a ROM, and an input and output interface, and the CPU performs various types of control of the vehicle 10 by performing signal processing in accordance with a program which is stored in the ROM in advance while using a temporary storage function of the RAM. The electronic control unit 100 is configured to include a computer for engine control, a computer for rotary machine control, and a computer for hydraulic pressure control according to necessity.

The electronic control unit 100 is supplied with various signals (for example, an intake air amount Qair, a supercharging pressure Pchg, an intake air temperature THair, a throttle valve opening amount θth, an engine rotation speed Ne, an output rotation speed No corresponding to a vehicle speed V, an MG1 rotation speed Ng which is the rotation speed of the first rotary machine MG1, an MG2 rotation speed Nm which is the rotation speed of the second rotary machine MG2, an accelerator opening amount θacc which is an accelerator operation amount by a driver indicating the magnitude of the driver's acceleration operation, a travel mode Mdrv which is a signal indicating a travel mode selected by a driver, a battery temperature THbat which is a temperature of the battery 54, a battery charging/discharging current Ibat, and a battery voltage Vbat) based on detection values from various sensors (for example, an air flowmeter 34, a supercharging pressure sensor 40, an intake air temperature sensor 42, a throttle valve opening amount sensor 44, an engine rotation speed sensor 88, an output rotation speed sensor 90, an MG1 rotation speed sensor 92, an MG2 rotation speed sensor 94, an accelerator opening amount sensor 96, a travel mode selection switch 97, and a battery sensor 98) which are provided in the vehicle 10. The travel mode Mdrv includes a plurality of travel modes which are set in advance in the vehicle 10, for example, a normal mode, a sport mode, and an echo mode (a fuel efficiency priority mode). The normal mode is, for example, a control mode in which power performance is well achieved and driving with high fuel efficiency is possible. The sport mode is, for example, a control mode in which driving in a state in which priority is given to power performance rather than fuel efficiency performance in comparison with the normal mode. The echo mode is, for example, a control mode in which driving in a state in which priority is given to fuel efficiency performance rather than power performance in comparison with the normal mode. That is, the echo mode is a fuel efficiency priority mode in which the highest priority is given to an increase in fuel efficiency out of the plurality of travel modes. The electronic control unit 100 outputs various command signals (for example, an engine control command signal Se for controlling the engine 12, a rotary machine control command signal Smg for controlling the first rotary machine MG1 and the second rotary machine MG2, and a hydraulic pressure control command signal Sp for controlling the operating states of the clutch C1 and the brake B1) to various devices (for example, the engine control device 50, the inverter 52, and the hydraulic pressure control circuit 84) which are provided in the vehicle 10.

The electronic control unit 100 calculates a state of charge value SOC [%] which is a value indicating the state of charge of the battery 54, for example, based on the battery charging/discharging current Ibat and the battery voltage Vbat. The electronic control unit 100 calculates chargeable and dischargeable power Win and Wout for defining a feasible range of a battery power Pbat which is the power of the battery 54, for example, based on the battery temperature THbat and the state of charge value SOC of the battery 54. The chargeable and dischargeable power Win and Wout includes a chargeable power Win which is a possible input power for defining a limitation of input power of the battery 54 and a dischargeable power Wout which is a possible output power for defining a limitation of output power of the battery 54. For example, the chargeable and dischargeable power Win and Wout decrease as the battery temperature THbat decreases in a low-temperature area in which the battery temperature THbat is lower than that in a normal area, and decreases as the battery temperature THbat increases in a high-temperature area in which the battery temperature THbat is higher than that in the normal area. For example, the chargeable power Win decreases as the state of charge value SOC increases in an area in which the state of charge value SOC is high. For example, the dischargeable power Wout decreases as the state of charge value SOC decreases in an area in which the state of charge value SOC is low.

The electronic control unit 100 includes a hybrid control means, that is, a hybrid control unit 102, that realizes various types of control in the vehicle 10.

The hybrid control unit 102 has a function of an engine control means, that is, an engine control unit 104, that controls the operation of the engine 12, a function of a rotary machine control means, that is, a rotary machine control unit 106, that controls the operations of the first rotary machine MG1 and the second rotary machine MG2 via the inverter 52, and a function of a power transmission switching means, that is, a power transmission switching unit 108, that switches a power transmission state in the gear shifting unit 58, and performs hybrid drive control or the like using the engine 12, the first rotary machine MG1, and the second rotary machine MG2 based on such control functions.

The hybrid control unit 102 calculates a required drive torque Twdem which is a drive torque Tw required of the vehicle 10, for example, by applying the accelerator opening amount θacc and the vehicle speed V to a relationship which is acquired and stored in advance by experiment or design, that is, a predetermined relationship, for example, a drive power map. In other words, the required drive torque Twdem is a required drive power Pwdem at the vehicle speed V at that time. Here, the output rotation speed No or the like may be used instead of the vehicle speed V. As the drive power map, for example, a map for forward travel and a map for reverse travel are separately set.

The hybrid control unit 102 outputs an engine control command signal Se which is a command signal for controlling the engine 12 and a rotary machine control command signal Smg which is a command signal for controlling the first rotary machine MG1 and the second rotary machine MG2 such that the required drive power Pwdem is realized by at least one power source of the engine 12, the first rotary machine MG1, and the second rotary machine MG2 in consideration of a required charging/discharging power which is a charging/discharging power required of the battery 54, or the like.

For example, when the vehicle travels in the HV travel mode, the engine control command signal Se is a command value of an engine power Pe for outputting a target engine torque Tetgt at a target engine rotation speed Netgt in consideration of an optimal engine operating point OPengf and the like and realizing the required engine power Pedem in consideration of the required charging/discharging power, charging/discharging efficiency in the battery 54, and the like in addition to the required drive power Pwdem. The rotary machine control command signal Smg is a command value of generated electric power Wg of the first rotary machine MG1 that outputs the MG1 torque Tg at the MG1 rotation speed Ng at the time of outputting the command as a reaction torque for causing the engine rotation speed Ne to reach the target engine rotation speed Netgt and is a command value of power consumption Wm of the second rotary machine MG2 that outputs the MG2 torque Tm at the MG2 rotation speed Nm at the time of outputting the command. For example, the MG1 torque Tg in the HV travel mode is calculated by feedback control in which the first rotary machine MG1 operates such that the engine rotation speed Ne reaches the target engine rotation speed Netgt. For example, the MG2 torque Tm in the HV travel mode is calculated such that the required drive torque Twdem is acquired by addition to a value corresponding to a drive torque Tw based on the direct engine-transmitted torque Td. The optimal engine operating point OPengf is determined in advance, for example, as an engine operating point OPeng at which total fuel efficiency in the vehicle 10 is the best in consideration of charging/discharging efficiency in the battery 54 in addition to the fuel efficiency of only the engine 12 when the required engine power Pedem is realized. The target engine rotation speed Netgt is a target value of the engine rotation speed Ne, that is, a target rotation speed of the engine 12, and the target engine torque Tetgt is a target value of the engine torque Te. The engine power Pe is an output, that is, a power, of the engine 12 and the required engine power Pedem is an output required of the engine 12. In this way, the vehicle 10 is a vehicle in which the MG1 torque Tg which is a reaction torque of the first rotary machine MG1 is controlled such that the engine rotation speed Ne reaches the target engine rotation speed Netgt.

Figure 4:
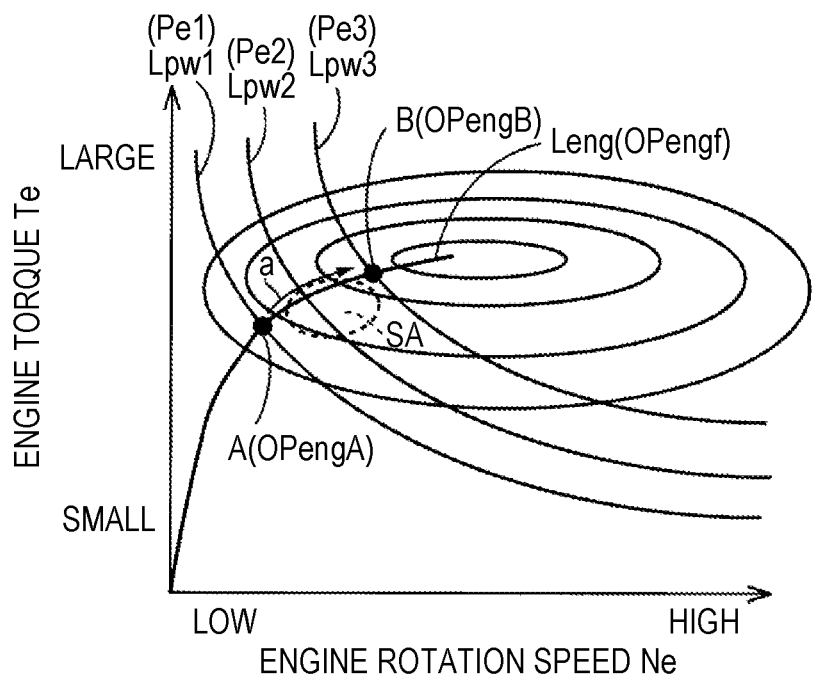
FIG. 4 is a diagram illustrating an example of an optimal engine operating point.

FIG. 4 is a diagram illustrating an example of the optimal engine operating point OPengf in a two-dimensional coordinate system with the engine rotation speed Ne and the engine torque Te as variables. In FIG. 4, a solid line Leng, that, is, a predetermined optimal fuel-efficiency operating line Leng, denotes a group of optimal engine operating points OPengf. Equi-power lines Lpw1, Lpw2, and Lpw3 denote examples in which the required engine power Pedem is required engine powers Pe1, Pe2, and Pe3, respectively. A point A is an engine operating point OPengA when the required engine power Pe1 is realized on the optimal engine operating point OPengf, and a point B is an engine operating point OPengB when the required engine power Pe3 is realized on the optimal engine operating point OPengf. The points A and B are also target values of the engine operating point OPeng which is expressed by the target engine rotation speed Netgt and the target engine torque Tetgt, that is, a target engine operating point OPengtgt which is a target operating point. For example, when the target engine operating point OPengtgt shifts from the point A to the point B with an increase in the accelerator opening amount θacc, the engine operating point OPeng is controlled such that it shifts on a path a passing through the optimal engine operating points OPengf, that is, the optimal fuel-efficiency operating line Leng.

The hybrid control unit 102 selectively sets up the EV travel mode or the HV travel mode as the travel mode according to the travel conditions and causes the vehicle 10 to travel in the corresponding travel mode. For example, the hybrid control unit 102 sets up the EV travel mode in a motor-driven travel area in which the required drive power Pwdem is less than a predetermined threshold value, and sets up the HV travel mode in a hybrid travel area in which the required drive power Pwdem is equal to or greater than the predetermined threshold value. Even when the required drive power Pwdem is in the motor-driven travel area, the hybrid control unit 102 sets up the HV travel mode when the state of charge value SOC of the battery 54 is less than a predetermined engine start threshold value or when warming-up of the engine 12 is necessary. The engine start threshold value is a predetermined threshold value for determining whether the state of charge value SOC indicates that the battery 54 needs to be charged by forcibly starting the engine 12.

Figure 5:
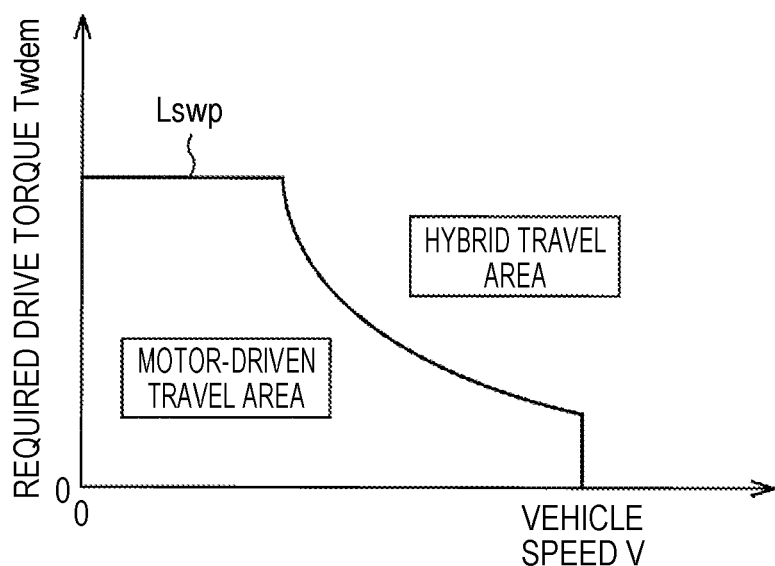
FIG. 5 is a diagram illustrating an example of a power source switching map which is used for switching control between motor-driven travel and hybrid-vehicle travel.

FIG. 5 is a diagram illustrating an example of a power source switching map which is used for switching control between motor-driven travel and hybrid travel. In FIG. 5, a solid line Lswp is a boundary line between the motor-driven travel area and the hybrid travel area at which switching between the motor-driven travel and the hybrid travel is performed. An area in which the vehicle speed V is relatively low, the required drive torque Twdem is relatively small, and the required drive power Pwdem is relatively small is defined in advance in the motor-driven travel area. An area in which the vehicle speed V is relatively high or the required drive torque Twdem is relatively great, and the required drive power Pwdem is relatively great is defined in advance in the hybrid travel area. When the State of charge value SOC of the battery 54 is less than the engine-start threshold value or when warming-up of the engine 12 is necessary, the motor-driven travel area in FIG. 5 may be shifted to the hybrid travel area.

When the EV travel mode is set up and the required drive power Pwdem can be realized by only the second rotary machine MG2, the hybrid control unit 102 sets up a single-motor-driven EV mode. On the other hand, when the EV travel mode is set up and the required drive power Pwdem cannot be realized by only the second rotary machine MG2, the hybrid control unit 102 sets up a double-motor-driven EV mode. Although the required drive power Pwdem can be realized by only the second rotary machine MG2, the hybrid control unit 102 may set up the double-motor-driven EV mode when use of both the first rotary machine MG1 and the second rotary machine MG2 is more efficient than use of only the second rotary machine MG2.

The hybrid control unit 102 controls engagement operations of the clutch C1 and the brake B1 based on the set-up travel mode. The hybrid control unit 102 outputs a hydraulic pressure control command signal Sp for engaging and/or disengaging the clutch C1 and the brake B1 to the hydraulic pressure control circuit 84 such that transmission of power for travel in the set-up travel mode becomes possible.

Figures 6, 7:
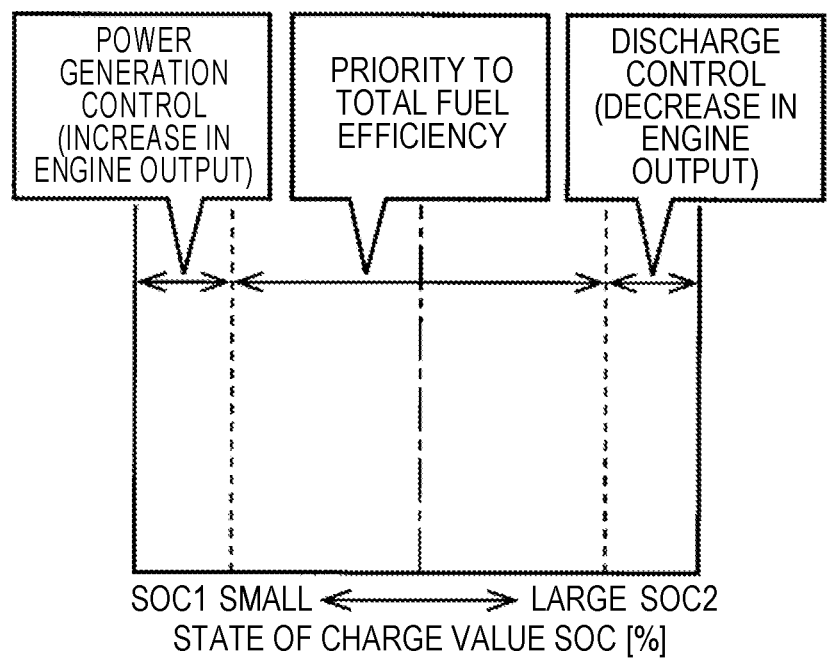
FIG. 6 is a diagram illustrating operating states of a clutch and a brake in each travel mode.
FIG. 7 is a diagram illustrating an example of a method of changing an engine operating point based on a state of charge value of a battery.

FIG. 6 is a table illustrating operating states of the clutch C1 and the brake B1 in the travel modes. In FIG. 6, mark O denotes engagement of the clutch C1 and the brake B1, a blank denotes disengagement, and mark Δ denotes that one thereof is engaged at the time of use in combination with engine brake for switching the engine 12 in a rotation-stopped state to a corotating state. "G" denotes that the first rotary machine MG1 serves mainly as a generator, and "M" denotes that the first rotary machine MG1 and the second rotary machine MG2 serve mainly as a motor at the time of driving and serve mainly as a generator at the time of regeneration. The vehicle 10 can selectively realize the EV travel mode and the HV travel mode as a travel mode. The EV travel mode has two modes including the single-motor-driven EV mode and the double-motor-driven EV mode.

The single-motor-driven EV mode is realized in a state in which both the clutch C1 and the brake B1 are disengaged. In the single-motor-driven EV mode, the clutch C1 and the brake B1 are disengaged and thus the gear shifting unit 58 falls into a neutral state. When the gear shifting unit 58 falls into the neutral state, the differential unit 60 falls into a neutral state in which a reaction torque of the MG1 torque Tg does not appear in the second carrier CA2 connected to the first ring gear R1. In this state, the hybrid control unit 102 causes the second rotary machine MG2 to output the MG2 torque Tm for travel (see the dotted line Lm1 in FIG. 3). In the single-motor-driven EV mode, reverse travel may be performed by rotating the second rotary machine MG2 oppositely to the rotating direction at the time of forward travel.

In the single-motor-driven EV mode, since the first ring gear R1 corotates with the second carrier CA2 but the gear shifting unit 58 is in the neutral state, the engine 12 does not corotate but is stopped with zero rotation. Accordingly, when regeneration control is performed in the second rotary machine MG2 during travel in the single-motor-driven EV mode, it is possible to take a large amount of regeneration. When the battery 54 is fully charged and regenerative energy does not appear at the time of travel in the single-motor-driven EV mode, use in combination with the engine brake can be considered. When the engine brake is used in combination, the brake B1 or the clutch C1 is engaged (see "use in combination with engine brake" in FIG. 6). When the brake B1 or the clutch C1 is engaged, the engine 12 is in a corotating state and the engine brake operates.

The double-motor-driven EV mode is realized in a state in which both the clutch C1 and the brake B1 are engaged. In the double-motor-driven EV mode, since the clutch C1 and the brake B1 are engaged, rotation of the rotary elements of the first planetary gear mechanism 80 is stopped, the engine 12 is stopped with zero rotation, and rotation of the second carrier CA2 connected to the first ring gear R1 is also stopped. When rotation of the second carrier CA2 is stopped, a reaction torque of the MG1 torque Tg appears in the second carrier CA2, and thus the MG1 torque Tg can be mechanically output from the second ring gear R2 and be transmitted to the driving wheels 16. In this state, the hybrid control unit 102 causes the first rotary machine MG1 and the second rotary machine MG2 to output the MG1 torque Tg and the MG2 torque Tm for travel (see the dotted line Lm2 in FIG. 3). In the double-motor-driven EV mode, both the first rotary machine MG1 and the second rotary machine MG2 can be rotated oppositely to the rotating direction at the time of forward travel to allow reverse travel.

A low state of the HV travel mode is realized in a state in which the clutch C1 is engaged and the brake B1 is disengaged. In the low state of the HV travel mode, since the clutch C1 is engaged, the rotary elements of the first planetary gear mechanism 80 are integrally rotated and the gear shifting unit 58 falls into a directly coupled state. Accordingly, rotation of the engine 12 is transmitted from the first ring gear R1 to the second carrier CA2 at a constant speed. A high state of the HV travel mode is realized in a state in which the brake B1 is engaged and the clutch C1 is disengaged. In the high state of the HV travel mode, since the brake B1 is engaged, rotation of the first sun gear S1 is stopped and the gear shifting unit 58 falls into an overdrive state. Accordingly, rotation of the engine 12 is increased and is transmitted from the first ring gear R1 to the second carrier CA2. In the HV travel mode, the hybrid control unit 102 causes the first rotary machine MG1 to output the MG1 torque Tg which is a reaction torque of the engine torque Te by power generation and causes the second rotary machine MG2 to output the MG2 torque Tm by the generated electric power Wg of the first rotary machine MG1 (see the solid line Lef in FIG. 3). In the HV travel mode, for example, in the low state of the HV travel mode, the second rotary machine MG2 can also be rotated oppositely to the rotating direction at the time of forward travel to allow reverse travel (see the solid line Ler in FIG. 3). In the HV travel mode, the vehicle can travel additionally using the MG2 torque Tm based on electric power from the battery 54. In the HV travel mode, for example, when the vehicle speed V is relatively high and the required drive torque Twdem is relatively small, the high state of the HV travel mode is set up.

In FIG. 4, a noise generation region (a region) SA in which a driver is likely to perceive combustion sounds of the engine 12 as generation of noise is determined in advance. When the engine operating point OPeng is in the noise generation region SA, combustion sounds of the engine 12 may become noise. Accordingly, when the engine operating point OPeng is in the noise generation region SA, it is conceivable that the engine operating point OPeng be shifted outside of the noise generation region SA such that generation of noise is curbed. However, for example, as illustrated in FIG. 4, the noise generation region SA is disposed on the optimal fuel-efficiency operating line Leng. Accordingly, when the engine operating point OPeng is shifted outside of the noise generation region SA, the engine operating point OPeng is separated away from the optimal fuel-efficiency operating line Leng and thus fuel efficiency may decrease. Therefore, in order to curb a decrease in fuel efficiency, for example, when the engine operating point OPeng is in the noise generation region SA, the hybrid control unit 102 shifts the engine operating point OPeng to an engine operating point OPeng on the optimal fuel-efficiency operating line Leng outside of the noise generation region SA.

Specifically, the electronic control unit 100 includes an engine operating point control means, that is, an engine operating point control unit 104a, in the engine control unit 104, and includes a rotary machine output adjusting means, that is, a rotary machine output adjusting unit 106a, in the rotary machine control unit 106 in order to realize a control function of curbing a decrease in fuel efficiency. The electronic control unit 100 further includes a region determining means, that is, a region determining unit 110, an SOC determining means, that is, an SOC determining unit 112, and a travel mode determining means, that is, a travel mode determining unit 114.

The region determining unit 110 determines whether the engine operating point OPeng is in the noise generation region SA. For example, when a noise duration time T [sec] in which the engine operating point OPeng stays in the noise generation region SA is longer than a predetermined time T1 [sec] which is determined in advance, the region determining unit 110 determines that the engine operating point OPeng is in the noise generation region SA. When the noise duration time T is equal to or less than the predetermined time T1, the region determining unit 110 determines that the engine operating point OPeng is not in the noise generation region SA. The predetermined time T1 is, for example, a relatively short time in which a driver is not likely to perceive combustion sounds of the engine 12 as generation of noise.

The SOC determining unit 112 includes a first determination means, that is, a first determination unit 112a, and a second determination means, that is, a second determination unit 112b. When the region determining unit 110 determines that the engine operating point OPeng is in the noise generation region SA, the first determination unit 112a determines whether a state of charge value SOC [%] of the battery 54 which is calculated based on the battery charging/discharging current Ibat and the battery voltage Vbat when the region determining unit 110 determines that the engine operating point OPeng is in the noise generation region SA is equal to or less than a predetermined lower-limit threshold value SOC1 [%] (see FIG. 7). The lower-limit threshold value SOC1 [%] is a predetermined threshold value for determining that the state of charge value is a state of charge value SOC [%] at which the battery 54 needs to be charged.

When the region determining unit 110 determines that the engine operating point OPeng is in the noise generation region SA, the second determination unit 112b determines whether the state of charge value SOC [%] of the battery 54 which is calculated based on the battery charging/discharging current Ibat and the battery voltage Vbat when the region determining unit 110 determines that the engine operating point OPeng is in the noise generation region SA is equal to or greater than a predetermined upper-limit threshold value SOC2 [%] (see FIG. 7). The upper-limit threshold value SOC2 [%] is a predetermined threshold value for determining that the state of charge value is a state of charge value SOC [%] at which the battery 54 needs to perform discharge.

When the region determining unit 110 determines that the engine operating point OPeng is in the noise generation region SA, the travel mode determining unit 114 determines whether a fuel efficiency priority mode in which priority is given to an increase in fuel efficiency has been selected. For example, when the travel mode Mdrv which is detected by the travel mode selection switch 97 when the region determining unit 110 determines that the engine operating point OPeng is in the noise generation region SA is the echo mode, the travel mode determining unit 114 determines that the fuel efficiency priority mode has been selected. When the travel mode Mdrv which is detected by the travel mode selection switch 97 when the region determining unit 110 determines that the engine operating point OPeng is in the noise generation region SA is a travel mode other than the echo mode, for example, the sport mode, the travel mode determining unit 114 determines that the fuel efficiency priority mode has not been selected.

When the region determining unit 110 determines that the engine operating point OPeng is not in the noise generation region SA, the engine operating point control unit 104a controls the engine operating point OPeng such that the engine operating point OPeng is shifted to an engine operating point OPeng on the optimal fuel-efficiency operating line Leng, that is, controls the engine operating point OPeng such that the engine operating point OPeng is shifted to an optimal engine operating point OPengf on the optimal fuel-efficiency operating line Leng in which the required engine power Pedem is realized, based on the required engine power Pedem required of the engine 12.

Figure 8:
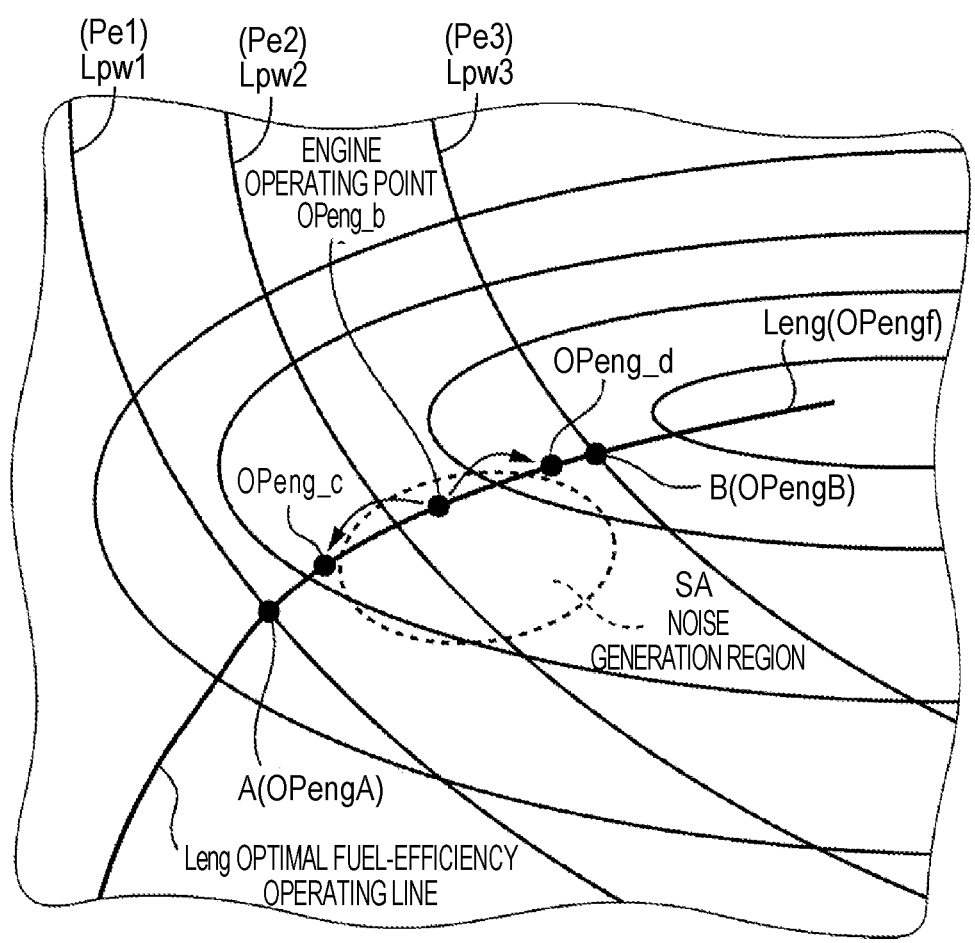
FIG. 8 is an enlarged view illustrating surroundings of a noise generation region illustrated in FIG. 4 and illustrating an example in which an engine operating point is shifted to an engine operating point on an optimal fuel-efficiency operating line outside the noise generation region.

When a preset first condition CD1 is satisfied, the engine operating point control unit 104a shifts the engine operating point OPeng to an engine operating point OPeng on the optimal fuel-efficiency operating line Leng outside of the noise generation region SA. The first condition CD1 is satisfied when the region determining unit 110 determines that the engine operating point OPeng is in the noise generation region SA, the SOC determining unit 112 determines that the state of charge value SOC is neither equal to or less than the lower-limit threshold value SOC1 nor equal to or greater than the upper-limit threshold value SOC2, and the travel mode determining unit 114 determines that the fuel efficiency priority mode has been selected. For example, when the first condition CD1 is satisfied, the engine operating point control unit 104a shifts an engine operating point OPeng_b to an engine operating point OPeng_c or an engine operating point OPeng_d on the optimal fuel-efficiency operating line Leng outside of the noise generation region SA as illustrated in FIG. 8. The engine operating point control unit 104a shifts the engine operating point OPeng_b to the engine operating point OPeng which is advantageous for total fuel efficiency in the vehicle 10 out of the engine operating point OPeng_c and the engine operating point OPeng_d. That is, when the state of charge value SOC is greater than the lower-limit threshold value SOC1 and less than the upper-limit threshold value SOC2 as illustrated in FIG. 7, the engine operating point OPeng_b is shifted to the engine operating point OPeng which is advantageous for total fuel efficiency in the vehicle 10 out of the engine operating point OPeng_c and the engine operating point OPeng_d. The engine operating point OPeng_b is an engine operating point OPeng when the region determining unit 110 determines that the engine operating point OPeng is in the noise generation region SA. The engine operating point OPeng_c is an engine operating point OPeng at which the output of the engine 12, that is, the engine power Pe, is lower than that at the engine operating point OPeng_b, and the engine operating point OPeng_c is a predetermined engine operating point OPeng on the optimal fuel-efficiency operating line Leng outside of the noise generation region SA. The engine operating point OPeng_d is an engine operating point OPeng at which the engine power Pe is higher than that at the engine operating point OPeng_b, and the engine operating point OPeng_d is a predetermined engine operating point OPeng on the optimal fuel-efficiency operating line Leng outside of the noise generation region SA.

When the first condition CD1 is satisfied and the engine operating point OPeng is shifted by the engine operating point control unit 104a, the rotary machine output adjusting unit 106a adjusts the output of the second rotary machine MG2 to compensate for a difference between the engine power Pe and the required engine power Pedem due to the shifting of the engine operating point OPeng, and for example, the difference becomes zero. For example, when the engine operating point control unit 104a shifts the engine operating point OPeng_b to the engine operating point OPeng_c as illustrated in FIG. 8, the rotary machine output adjusting unit 106a increases the output of the second rotary machine MG2 to compensate for the decrease in the engine power Pe due to the shifting of the engine operating point OPeng_b to the engine operating point OPeng_c. When the engine operating point control unit 104a shifts the engine operating point OPeng_b to the engine operating point OPeng_d as illustrated in FIG. 8, the rotary machine output adjusting unit 106a decreases the output of the second rotary machine MG2 to compensate for the increase in the engine power Pe due to the shifting of the engine operating point OPeng_b to the engine operating point OPeng_d.

Figure 9:
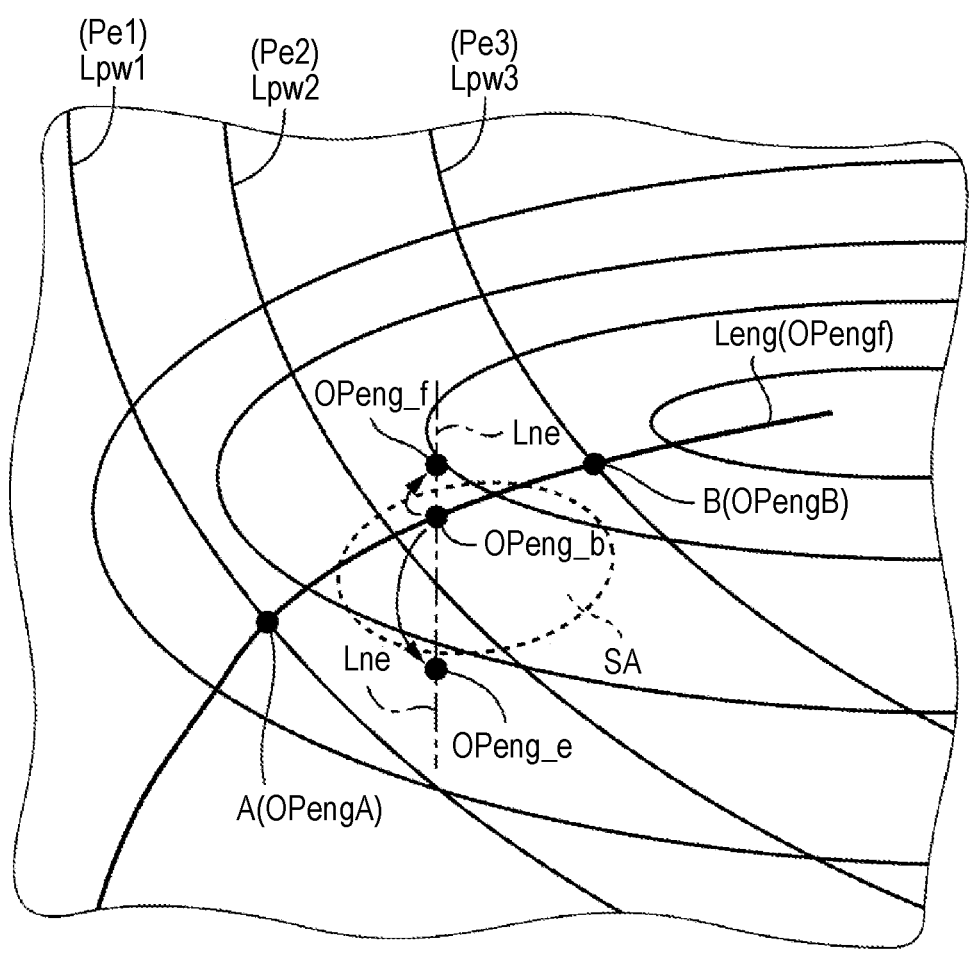
FIG. 9 is an enlarged view illustrating surroundings of a noise generation region illustrated in FIG. 4 and illustrating an example in which an engine operating point is shifted to an engine operating point on an engine rotation speed contour line outside the noise generation region.

When a preset second condition CD2 is satisfied, the engine operating point control unit 104a shifts the engine operating point OPeng to an engine operating point OPeng on an engine rotation speed contour line Lne outside of the noise generation region SA. The second condition CD2 is satisfied when the region determining unit 110 determines that the engine operating point OPeng is in the noise generation region SA, the SOC determining unit 112 determines that the state of charge value SOC is neither equal to or less than the lower-limit threshold value SOC1 nor equal to or greater than the upper-limit threshold value SOC2, and the travel mode determining unit 114 determines that the fuel efficiency priority mode has not been selected. For example, when the second condition CD2 is satisfied, the engine operating point control unit 104a shifts the engine operating point OPeng_b to an engine operating point OPeng_e or an engine operating point OPeng_f on the engine rotation speed contour line Lne outside of the noise generation region SA as illustrated in FIG. 9. The engine operating point control unit 104a shifts the engine operating point OPeng_b to the engine operating point OPeng which is advantageous for total fuel efficiency in the vehicle 10 out of the engine operating point OPeng_e and the engine operating point OPeng_f That is, when the state of charge value SOC is greater than the lower-limit threshold value SOC1 and less than the upper-limit threshold value SOC2 as illustrated in FIG. 7, the engine operating point OPeng_b is shifted to the engine operating point OPeng which is advantageous for total fuel efficiency in the vehicle 10 out of the engine operating point OPeng_e and the engine operating point OPeng_f. The engine rotation speed contour line Lne is a line indicating the same engine rotation speed Ne as the engine rotation speed Ne at the engine operating point OPeng when the region determining unit 110 determines that the engine operating point OPeng is in the noise generation region SA. The engine operating point OPeng_e is an engine operating point OPeng at which the engine rotation speed Ne is the same as the engine rotation speed Ne at the engine operating point OPeng_b and the engine power Pe is lower than that at the engine operating point OPeng_b, and the engine operating point OPeng_e is a predetermined engine operating point OPeng on the engine rotation speed contour line Lne outside of the noise generation region SA. The engine operating point OPeng_f is an engine operating point OPeng at which the engine rotation speed Ne is the same as the engine rotation speed Ne at the engine operating point OPeng_b and the engine power Pe is higher than that at the engine operating point OPeng_b, and the engine operating point OPeng_f is a predetermined engine operating point OPeng on the engine rotation speed contour line Lne outside of the noise generation region SA. The engine operating point OPeng which is shifted by the engine operating point control unit 104a when the second condition CD2 is satisfied is set in advance, for example, for each engine rotation speed Ne at the engine operating point OPeng, that is, for each engine rotation speed contour line Lne, when the region determining unit 110 determines that the engine operating point OPeng is in the noise generation region SA.

When the second condition CD2 is satisfied and the engine operating point OPeng is shifted by the engine operating point control unit 104a, the rotary machine output adjusting unit 106a adjusts the output of the second rotary machine MG2 to compensate for a difference between the engine power Pe and the required engine power Pedem due to the shifting of the engine operating point OPeng, and for example, the difference becomes zero. For example, when the engine operating point control unit 104a shifts the engine operating point OPeng_b to the engine operating point OPeng_e as illustrated in FIG. 9, the rotary machine output adjusting unit 106a increases the output of the second rotary machine MG2 to compensate for the decrease in the engine power Pe due to the shifting of the engine operating point OPeng_b to the engine operating point OPeng_e. When the engine operating point control unit 104a shifts the engine operating point OPeng_b to the engine operating point OPeng_f as illustrated in FIG. 9, the rotary machine output adjusting unit 106a decreases the output of the second rotary machine MG2 to compensate for the increase in the engine power Pe due to the shifting of the engine operating point OPeng_b to the engine operating point OPeng_f.

When a preset third condition CD3 is satisfied, the engine operating point control unit 104a shifts the engine operating point OPeng to an engine operating point OPeng on an optimal fuel-efficiency operating line Leng outside of the noise generation region SA. The third condition CD3 is satisfied when the region determining unit 110 determines that the engine operating point OPeng is in the noise generation region SA, the SOC determining unit 112 determines that the state of charge value SOC is equal to or less than the lower-limit threshold value SOC1 or equal to or greater than the upper-limit threshold value SOC2, and the travel mode determining unit 114 determines that the fuel efficiency priority mode has been selected. For example, when the third condition CD3 is satisfied, the engine operating point control unit 104a shifts the engine operating point OPeng_b to the engine operating point OPeng_c or the engine operating point OPeng_d on the optimal fuel-efficiency operating line Leng outside of the noise generation region SA as illustrated in FIG. 8. For example, when the first determination unit 112a determines that the state of charge value SOC is equal to or less than the lower-limit threshold value SOC1 as illustrated in FIG. 7, the engine operating point control unit 104a shifts the engine operating point OPeng_b to the engine operating point OPeng_d on the side on which the output of the engine 12 is increased out of the engine operating point OPeng_c and the engine operating point OPeng_d. For example, when the second determination unit 112b determines that the state of charge value SOC is equal to or greater than the upper-limit threshold value SOC2 as illustrated in FIG. 7, the engine operating point control unit 104a shifts the engine operating point OPeng_b to the engine operating point OPeng_c on the side on which the output of the engine 12 is decreased out of the engine operating point OPeng_c and the engine operating point OPeng_d.

When the third condition CD3 is satisfied and the engine operating point OPeng is shifted by the engine operating point control unit 104a, the rotary machine output adjusting unit 106a adjusts the output of the second rotary machine MG2 to compensate for a difference between the engine power Pe and the required engine power Pedem due to the shifting of the engine operating point OPeng, and for example, the difference becomes zero. For example, when the engine operating point control unit 104a shifts the engine operating point OPeng_b to the engine operating point OPeng_c as illustrated in FIG. 8, the rotary machine output adjusting unit 106a increases the output of the second rotary machine MG2 to compensate for the decrease in the engine power Pe due to the shifting of the engine operating point OPeng_b to the engine operating point OPeng_c. For example, when the output of the second rotary machine MG2 is increased to compensate for the decrease in the engine power Pe, an amount of discharged electric power in the second rotary machine MG2 is increased, a reaction torque of the first rotary machine MG1 is decreased due to the shifting of the engine operating point OPeng_b to the engine operating point OPeng_c, and thus an amount of electric power generated in the first rotary machine MG1 is decreased. Accordingly, an amount of electric power discharged from the battery 54 increases and the state of charge value SOC of the battery 54 decreases. When the engine operating point control unit 104a shifts the engine operating point OPeng_b to the engine operating point OPeng_d as illustrated in FIG. 8, the rotary machine output adjusting unit 106a decreases the output of the second rotary machine MG2 to compensate for the increase in the engine power Pe due to the shifting of the engine operating point OPeng_b to the engine operating point OPeng_d. For example, when the output of the second rotary machine MG2 is decreased to compensate for the increase in the engine power Pe, an amount of discharged electric power in the second rotary machine MG2 is decreased, a reaction torque of the first rotary machine MG1 is increased due to the shifting of the engine operating point OPeng_b to the engine operating point OPeng_d, and thus an amount of electric power generated in the first rotary machine MG1 is increased. Accordingly, an amount of electric power charged by the battery 54 increases and the state of charge value SOC of the battery 54 increases.

When a preset fourth condition CD4 is satisfied, the engine operating point control unit 104a shifts the engine operating point OPeng to an engine operating point OPeng on an engine rotation speed contour line Lne outside of the noise generation region SA. The fourth condition CD4 is satisfied when the region determining unit 110 determines that the engine operating point OPeng is in the noise generation region SA, the SOC determining unit 112 determines that the state of charge value SOC is equal to or less than the lower-limit threshold value SOC1 or equal to or greater than the upper-limit threshold value SOC2, and the travel mode determining unit 114 determines that the fuel efficiency priority mode has not been selected. For example, when the fourth condition CD4 is satisfied, the engine operating point control unit 104a shifts the engine operating point OPeng_b to an engine operating point OPeng_e or an engine operating point OPeng_f on the engine rotation speed contour line Lne outside of the noise generation region SA as illustrated in FIG. 9. For example, when the first determination unit 112a determines that the state of charge value SOC is equal to or less than the lower-limit threshold value SOC1 as illustrated in FIG. 7, the engine operating point control unit 104a shifts the engine operating point OPeng_b to the engine operating point OPeng_f on the side on which the output of the engine 12 is increased out of the engine operating point OPeng_e and the engine operating point OPeng_f. For example, when the second determination unit 112b determines that the state of charge value SOC is equal to or greater than the upper-limit threshold value SOC2 as illustrated in FIG. 7, the engine operating point control unit 104a shifts the engine operating point OPeng_b to the engine operating point OPeng_e on the side on which the output of the engine 12 is decreased out of the engine operating point OPeng_e and the engine operating point OPeng_f.

When the fourth condition CD4 is satisfied and the engine operating point OPeng is shifted by the engine operating point control unit 104a, the rotary machine output adjusting unit 106a adjusts the output of the second rotary machine MG2 to compensate for a difference between the engine power Pe and the required engine power Pedem due to the shifting of the engine operating point OPeng, and for example, the difference becomes zero. For example, when the engine operating point control unit 104a shifts the engine operating point OPeng_b to the engine operating point OPeng_e as illustrated in FIG. 9, the rotary machine output adjusting unit 106a increases the output of the second rotary machine MG2 to compensate for the decrease in the engine power Pe due to the shifting of the engine operating point OPeng_b to the engine operating point OPeng_e. For example, when the output of the second rotary machine MG2 is increased to compensate for the decrease in the engine power Pe, an amount of discharged electric power in the second rotary machine MG2 is increased, a reaction torque of the first rotary machine MG1 is decreased due to the shifting of the engine operating point OPeng_b to the engine operating point OPeng_e, and thus an amount of electric power generated in the first rotary machine MG1 is decreased. Accordingly, an amount of electric power discharged from the battery 54 increases and the state of charge value SOC of the battery 54 decreases. When the engine operating point control unit 104a shifts the engine operating point OPeng_b to the engine operating point OPeng_f as illustrated in FIG. 9, the rotary machine output adjusting unit 106a decreases the output of the second rotary machine MG2 to compensate for the increase in the engine power Pe due to the shifting of the engine operating point OPeng_b to the engine operating point OPeng_f. For example, when the output of the second rotary machine MG2 is decreased to compensate for the increase in the engine power Pe, an amount of discharged electric power in the second rotary machine MG2 is decreased, a reaction torque of the first rotary machine MG1 is increased due to the shifting of the engine operating point OPeng_b to the engine operating point OPeng_f, and thus an amount of electric power generated in the first rotary machine MG1 is increased. Accordingly, an amount of electric power charged by the battery 54 increases and the state of charge value SOC of the battery 54 increases.

Figure 10:
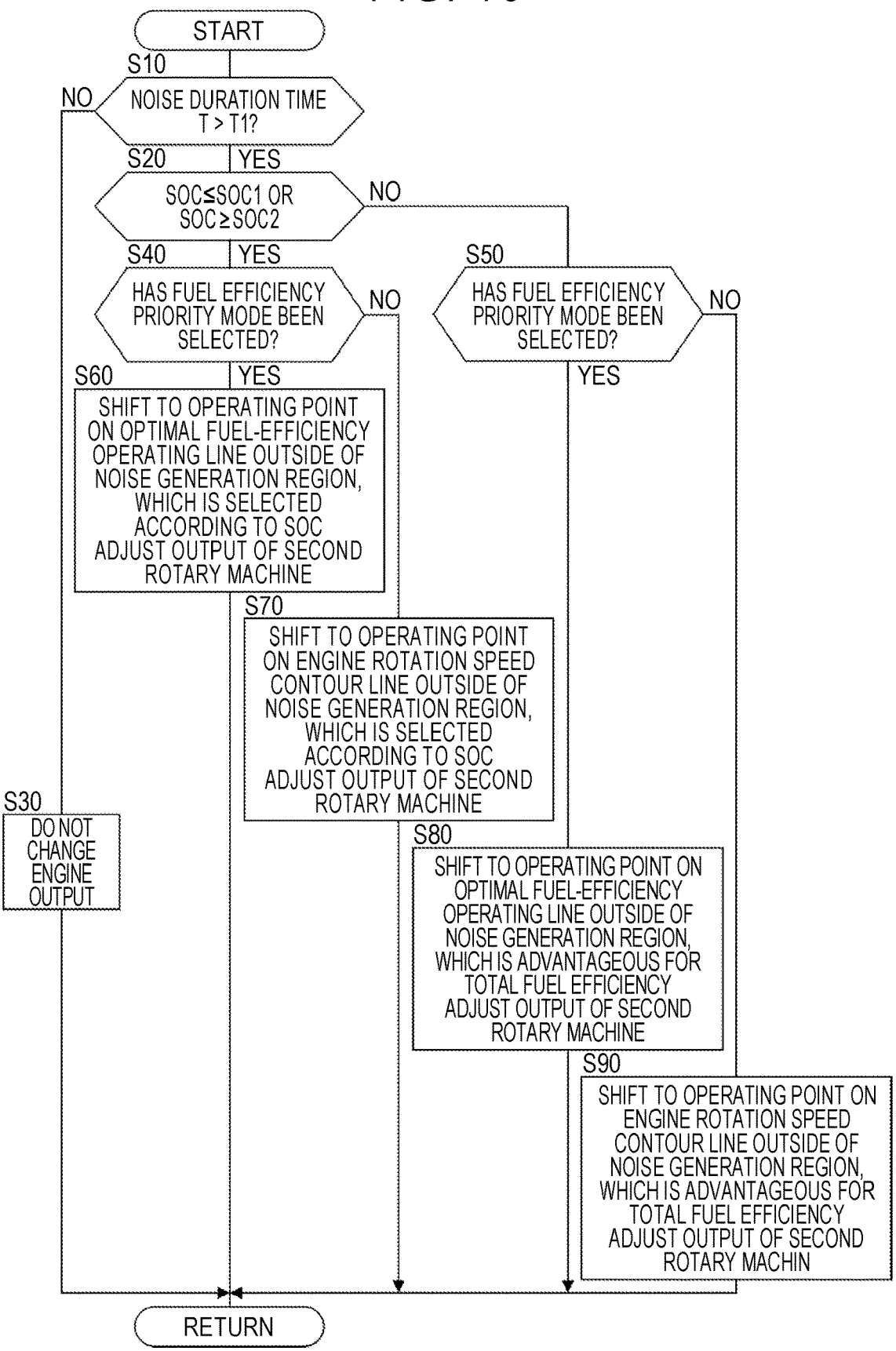
FIG. 10 is a flowchart illustrating a principal part of a control operation of the electronic control unit and illustrating a control operation for curbing a decrease in fuel efficiency.

FIG. 10 is a flowchart illustrating a principal part of the control operation of the electronic control unit 100 and illustrating the control operation for curbing a decrease in fuel efficiency.

In FIG. 10, first, in Step (the word "step" is omitted below) S10 corresponding to the function of the region determining unit 110, it is determined whether the engine operating point OPeng is in the noise generation region SA, that is, whether the noise duration time T is longer than the predetermined time T1. When the determination result of S10 is positive, that is, when the engine operating point OPeng is in the noise generation region SA, S20 corresponding to the function of the SOC determining unit 112 is performed. When the determination result of S10 is negative, that is, when the engine operating point OPeng is not in the noise generation region SA, S30 corresponding to the function of the engine operating point control unit 104a is performed. In S20, it is determined whether the state of charge value SOC of the battery 54 is equal to or less than the lower-limit threshold value SOC1 or equal to or greater than the upper-limit threshold value SOC2. In S30, the output of the engine 12 is not changed and the engine operating point OPeng is controlled based on the required engine power Pedem such that the engine operating point OPeng reaches an engine operating point OPeng on the optimal fuel-efficiency operating line Leng.

When the determination result of S20 is positive, that is, when the state of charge value SOC is equal to or less than the lower-limit threshold value SOC1 or equal to or greater than the upper-limit threshold value SOC2, S40 corresponding to the function of the travel mode determining unit 114 is performed. When the determination result of S20 is negative, that is, when the state of charge value SOC is neither equal to or less than the lower-limit threshold value SOC1 nor equal to or greater than the upper-limit threshold value SOC2, S50 corresponding to the function of the travel mode determining unit 114 is performed. In S40 and S50, it is determined whether the echo mode which is the fuel efficiency priority mode is selected.

When the determination result of S40 is positive, that is, when the echo mode is selected and the third condition CD3 is satisfied, S60 corresponding to the functions of the engine operating point control unit 104a and the rotary machine output adjusting unit 106a is performed. When the determination result of S40 is negative, that is, when the echo mode is not selected and the fourth condition CD4 is satisfied, S70 corresponding to the functions of the engine operating point control unit 104a and the rotary machine output adjusting unit 106a is performed. In S60, for example, when the state of charge value SOC is equal to or less than the lower-limit threshold value SOC1, the engine operating point OPeng_b is shifted to the engine operating point OPeng_d on the optimal fuel-efficiency operating line Leng outside of the noise generation region SA as illustrated in FIG. 8, and the output of the second rotary machine MG2 is decreased to compensate for the increase in the engine power Pe due to the shifting of the engine operating point OPeng_b to the engine operating point OPeng_d. In S60, for example, when the state of charge value SOC is equal to or greater than the upper-limit threshold value SOC2, the engine operating point OPeng_b is shifted to the engine operating point OPeng_c on the optimal fuel-efficiency operating line Leng outside of the noise generation region SA as illustrated in FIG. 8, and the output of the second rotary machine MG2 is increased to compensate for the decrease in the engine power Pe due to the shifting of the engine operating point OPeng_b to the engine operating point OPeng_c. In S70, for example, when the state of charge value SOC is equal to or less than the lower-limit threshold value SOC1, the engine operating point OPeng_b is shifted to the engine operating point OPeng_f on the engine rotation speed contour line Lne outside of the noise generation region SA as illustrated in FIG. 9, and the output of the second rotary machine MG2 is decreased to compensate for the increase in the engine power Pe due to the shifting of the engine operating point OPeng_b to the engine operating point OPeng_f. In S70, for example, when the state of charge value SOC is equal to or greater than the upper-limit threshold value SOC2, the engine operating point OPeng_b is shifted to the engine operating point OPeng_e on the engine rotation speed contour line Lne outside of the noise generation region SA as illustrated in FIG. 9, and the output of the second rotary machine MG2 is increased to compensate for the decrease in the engine power Pe due to the shifting of the engine operating point OPeng_b to the engine operating point OPeng_e.

When the determination result of S50 is positive, that is, when the echo mode is selected and the first condition CD1 is satisfied, S80 corresponding to the functions of the engine operating point control unit 104*a* and the rotary machine output adjusting unit 106*a* is performed. When the determination result of S50 is negative, that is, when the echo mode is not selected and the second condition CD2 is satisfied, S90 corresponding to the functions of the engine operating point control unit 104*a* and the rotary machine output adjusting unit 106*a* is performed. In S80, for example, when shifting of the engine operating point OPeng_b to the engine operating point OPeng_d is more advantageous for total fuel efficiency than shifting of the engine operating point OPeng_b to the engine operating point OPeng_c, the engine operating point OPeng_b is shifted to the engine operating point OPeng_d on the optimal fuel-efficiency operating line Leng outside of the noise generation region SA as illustrated in FIG. 8, and the output of the second rotary machine MG2 is decreased to compensate for the increase in the engine power Pe due to the shifting of the engine operating point OPeng_b to the engine operating point OPeng_d. In S80, for example, when shifting of the engine operating point OPeng_b to the engine operating point OPeng_c is more advantageous for total fuel efficiency than shifting of the engine operating point OPeng_b to the engine operating point OPeng_d, the engine operating point OPeng_b is shifted to the engine operating point OPeng_c on the optimal fuel-efficiency operating line Leng outside of the noise generation region SA as illustrated in FIG. 8, and the output of the second rotary machine MG2 is increased to compensate for the decrease in the engine power Pe due to the shifting of the engine operating point OPeng_b to the engine operating point OPeng_c. In S90, for example, when shifting of the engine operating point OPeng_b to the engine operating point OPeng_f is more advantageous for total fuel efficiency than shifting of the engine operating point OPeng_b to the engine operating point OPeng_e, the engine operating point OPeng_b is shifted to the engine operating point OPeng_f on the engine rotation speed contour line Lne outside of the noise generation region SA as illustrated in FIG. 9, and the output of the second rotary machine MG2 is decreased to compensate for the increase in the engine power Pe due to the shifting of the engine operating point OPeng_b to the engine operating point OPeng_f. In S90, for example, when shifting of the engine operating point OPeng_b to the engine operating point OPeng_e is more advantageous for total fuel efficiency than shifting of the engine operating point OPeng_b to the engine operating point OPeng_f, the engine operating point OPeng_b is shifted to the engine operating point OPeng_e on the engine rotation speed contour line Lne outside of the noise generation region SA as illustrated in FIG. 9, and the output of the second rotary machine MG2 is increased to compensate for the decrease in the engine power Pe due to the shifting of the engine operating point OPeng_b to the engine operating point OPeng_e.

According to the embodiment described above, the electronic control unit 100 includes: the engine operating point control unit 104*a* configured to control the engine operating point OPeng such that the engine operating point OPeng reaches an engine operating point OPeng on a predetermined optimal fuel-efficiency operating line Leng based on a required engine power Pedem required of the engine 12 and to shift the engine operating point OPeng to an engine operating point OPeng on the optimal fuel-efficiency operating line Leng outside of the noise generation region SA in which combustion sounds of the engine 12 become noise when the engine operating point OPeng is in the noise generation region SA; and the rotary machine output adjusting unit 106*a* configured to adjust the output of the second rotary machine MG2 to compensate for a difference between the engine power Pe and the required engine power Pedem due to the shifting of the engine operating point OPeng. Accordingly, when the engine operating point OPeng is in the noise generation region SA, the engine operating point control unit 104*a* shifts the engine operating point OPeng to an engine operating point OPeng on the optimal fuel-efficiency operating line Leng outside of the noise generation region SA. As a result, since the engine operating point is not separated from the optimal fuel-efficiency operating line Leng even when the engine operating point OPeng departs from the noise generation region SA, it is possible to curb a decrease in fuel efficiency. Even when the engine operating point control unit 104*a* shifts the engine operating point OPeng to change the engine power Pe, the rotary machine output adjusting unit 106*a* adjusts the output of the second rotary machine MG2 to compensate for the difference between the engine power Pe and the required engine power Pedem. Accordingly, it is possible to appropriately curb deterioration in drivability due to the shifting of the engine operating point OPeng by the engine operating point control unit 104*a*.

According to this embodiment, the vehicle 10 includes a plurality of travel modes including an echo mode in which priority is given to an increase in fuel efficiency, and the engine operating point control unit 104*a* shifts the engine operating point OPeng to an engine operating point OPeng on the optimal fuel-efficiency operating line Leng outside of the noise generation region SA when the engine operating point OPeng is in the noise generation region SA and the echo mode is selected as the travel mode and shifts the engine operating point OPeng to an engine operating point OPeng on the engine rotation speed contour line Lne in which an engine rotation speed Ne is the same as the engine rotation speed Ne at an engine operating point OPeng in the noise generation region SA outside of the noise generation region SA when the echo mode is not selected as the travel mode. Accordingly, when the echo mode is selected, the engine operating point control unit 104*a* curbs separation of the engine operating point OPeng from the optimal fuel-efficiency operating line Leng even when the engine operating point OPeng departs from the noise generation region SA, and thus it is possible to curb a decrease in fuel efficiency. When the echo mode is not selected, the engine operating point control unit 104*a* does not shift the engine rotation speed Ne at the engine operating point OPeng in the noise generation region SA even when the noise generation region SA is shifted, and thus it is possible to appropriately curb deterioration in drive feeling due to the shifting of the engine rotation speed Ne.

According to this embodiment, the vehicle 10 includes the battery 54 that transmits and receives electric power to and from the second rotary machine MG2, and the engine operating point control unit 104*a* shifts the engine operating point OPeng to an engine operating point OPeng on the side on which the engine power Pe is increased outside of the noise generation region SA from the engine operating point OPeng in the noise generation region SA when the engine operating point OPeng is in the noise generation region SA and the state of charge value SOC of the battery 54 is equal to or less than the predetermined lower-limit threshold value SOC1. Accordingly, when the state of charge value SOC is equal to or less than the lower-limit threshold value SOC1, the engine operating point control unit 104*a* shifts the engine operating point OPeng to an engine operating point OPeng on the side on which the engine power Pe is increased outside of the noise generation region SA from the engine operating point OPeng in the noise generation region SA, and thus it is possible to increase the state of charge value SOC by increasing an amount of charged electric power of the battery 54 using the engine power Pe corresponding to the increase in the engine power Pe. Accordingly, the engine operating point control unit 104a can appropriately shift the engine operating point OPeng based on the state of charge value SOC of the battery 54.

According to this embodiment, the vehicle 10 includes the battery 54 that transmits and receives electric power to and from the second rotary machine MG2, and the engine operating point control unit 104a shifts the engine operating point OPeng to an engine operating point OPeng on the side on which the engine power Pe is decreased outside of the noise generation region SA from the engine operating point OPeng in the noise generation region SA when the engine operating point OPeng is in the noise generation region SA and the state of charge value SOC of the battery 54 is equal to or greater than the predetermined upper-limit threshold value SOC2. Accordingly, when the state of charge value SOC is equal to or greater than the upper-limit threshold value SOC2, the engine operating point control unit 104a shifts the engine operating point OPeng to an engine operating point OPeng on the side on which the engine power Pe is decreased outside of the noise generation region SA from the engine operating point OPeng in the noise generation region SA, and thus it is possible to decrease the state of charge value SOC by increasing an amount of discharged electric power of the battery 54 using the engine power Pe corresponding to the decrease in the engine power Pe. Accordingly, the engine operating point control unit 104a can appropriately shift the engine operating point OPeng based on the state of charge value SOC of the battery 54.

According to this embodiment, the engine operating point control unit 104a shifts the engine operating point OPeng to an engine operating point OPeng on the optimal fuel-efficiency operating line Leng outside of the noise generation region SA when the noise duration time T in which the engine operating point OPeng stays in the noise generation region SA is longer than the predetermined time T1 which is determined in advance, and controls the engine operating point OPeng such that the engine operating point OPeng is shifted an engine operating point OPeng on the optimal fuel-efficiency operating line Leng based on the required engine power Pedem when the noise duration time T is equal to or shorter than the predetermined time T1. Accordingly, when the noise duration time T is longer than the predetermined time T1, the engine operating point control unit 104a shifts the engine operating point OPeng. Accordingly, for example, in comparison with a case in which the engine operating point OPeng is shifted when the engine operating point OPeng is in the noise generation region SA, it is possible to curb excessive shifting of the noise generation region SA.

Another embodiment of the disclosure will be described below. In the following description, elements which are common to the embodiments will be referred to by the same reference signs and description thereof will be omitted.

In this embodiment, a vehicle 200 which is different from the vehicle 10 described above in the first embodiment and which is illustrated in FIG. 11 is exemplified. FIG. 11 is a diagram schematically illustrating a configuration of a vehicle 200 to which the disclosure is applied. In FIG. 11, the vehicle 200 is a hybrid vehicle including an engine 202, a first rotary machine MG1, a second rotary machine (a rotary machine) MG2, a power transmission device 204, and driving wheels 206.

The engine 202, the first rotary machine MG1, and the second rotary machine MG2 have the same configurations as the engine 12, the first rotary machine MG1, and the second rotary machine MG2 described above in the first embodiment. An engine torque Te of the engine 202 is controlled by causing an electronic control unit (a control device) 240 which will be described later to control an engine control device 208 including a throttle actuator, a fuel injection device, an ignition device, and a waste gate valve which are provided in the vehicle 200. The first rotary machine MG1 and the second rotary machine MG2 are connected to a battery (a power storage device) 212 that is provided in the vehicle 200 via an inverter 210 which is provided in the vehicle 200. An MG1 torque Tg and an MG2 torque Tm of the first rotary machine MG1 and the second rotary machine MG2 are controlled by causing the electronic control unit 240 to control the inverter 210.

The power transmission device 204 includes an electrical stepless gear shifting unit 216 and a mechanical stepped gear shifting unit 218 which are arranged in series on a common axis in a case 214 that is a non-rotary member attached to a vehicle body. The electrical stepless gear shifting unit 216 is connected to the engine 202 directly or indirectly via a damper which is not illustrated or the like. The mechanical stepped gear shifting unit 218 is connected to an output side of the electrical stepless gear shifting unit 216. The power transmission device 204 includes a differential gear unit 222 that is connected to an output shaft 220 which is an output rotary member of the mechanical stepped gear shifting unit 218 and a pair of axles 224 that is connected to the differential gear unit 222. In the power transmission device 204, power which is output from the engine 202 or the second rotary machine MG2 is transmitted to the mechanical stepped gear shifting unit 218 and is transmitted from the mechanical stepped gear shifting unit 218 to the driving wheels 206 via the differential gear unit 222 or the like. The power transmission device 204 having this configuration is suitably used for a vehicle of a front-engine rear-drive (FR) type. In the following description, the electrical stepless gear shifting unit 216 is referred to as a stepless gear shifting unit 216 and the mechanical stepped gear shifting unit 218 is referred to as a stepped gear shifting unit 218. The stepless gear shifting unit 216, the stepped gear shifting unit 218, or the like is disposed to be substantially symmetric with respect to the common axis, and a lower half with respect to the axis is not illustrated in FIG. 11. The common axis is an axis of a crankshaft of the engine 202, a connection shaft 226 connected to the crankshaft, or the like.

The stepless gear shifting unit 216 includes a differential mechanism 230 that is a power split mechanism that mechanically splits power of the engine 202 to the first rotary machine MG1 and an intermediate transmission member 228 which is an output rotary member of the stepless gear shifting unit 216. The first rotary machine MG1 is a rotary machine to which power of the engine 202 is transmitted. The second rotary machine MG2 is connected to the intermediate transmission member 228 in a power-transmittable manner. Since the intermediate transmission member 228 is connected to the driving wheels 206 via the stepped gear shifting unit 218, the second rotary machine MG2 is a rotary machine that is connected to the driving wheels 206 in a power-transmittable manner. The differential mechanism 230 is a differential mechanism that splits and transmits the power of the engine 202 to the driving wheels 206 and the first rotary machine MG1. The stepless gear shifting unit 216 is an electrical stepless transmission in which a differential state of the differential mechanism 230 is controlled by controlling the operating state of the first rotary machine MG1. The first rotary machine MG1 is a rotary machine that can control the engine rotation speed Ne.

The differential mechanism 230 is constituted by a single-pinion type planetary gear unit and includes a sun gear S0, a carrier CA0, and a ring gear R0. The engine 202 is connected to the carrier CA0 via the connection shaft 226 in a power-transmittable manner, the first rotary machine MG1 is connected to the sun gear S0 in a power-transmittable manner, and the second rotary machine MG2 is connected to the ring gear R0 in a power-transmittable manner. In the differential mechanism 230, the carrier CA0 serves as an input element, the sun gear S0 serves as a reaction element, and the ring gear R0 serves as an output element.

The stepped gear shifting unit 218 is a mechanical gear shifting mechanism which is a stepped transmission constituting at least a part of a power transmission path between the intermediate transmission member 228 and the driving wheels 206, that is, an automatic transmission constituting a part of the power transmission path between the differential mechanism 230 and the driving wheels 206. The intermediate transmission member 228 also serves as an input rotary member of the stepped gear shifting unit 218. The stepped gear shifting unit 218 is, for example, a known planetary gear type automatic transmission including a plurality of planetary gear units such as a first planetary gear unit 232 and a second planetary gear unit 234 and a plurality of engagement devices such as a one-way clutch F1, a clutch C1, a clutch C2, a brake B1, and a brake B2. In the following description, the clutch C1, the clutch C2, the brake B1, and the brake B2 are simply referred to as engagement devices CB when not particularly distinguished.

Each engagement device CB is a hydraulic frictional engagement device which is constituted by a multi-disc or single-disc clutch or brake which is pressed by a hydraulic actuator, a band brake which is tightened by a hydraulic actuator, and the like. The operating state such as an engaged state or a disengaged state of each engagement device CB is switched by changing an engagement torque Tcb which is a torque capacity thereof using adjusted engagement oil pressures PRcb of the engagement devices CB which are output from solenoid valves SL1 to SL4 in a hydraulic pressure control circuit 236 which is provided in the vehicle 200.

In the stepped gear shifting unit 218, rotary elements of the first planetary gear unit 232 and the second planetary gear unit 234 are partially connected to each other or are connected to the intermediate transmission member 228, the case 214, or the output shaft 220 directly or indirectly via the engagement devices CB or the one-way clutch F1. The rotary elements of the first planetary gear unit 232 are a sun gear S1, a carrier CA1, and a ring gear R1, and the rotary elements of the second planetary gear unit 234 are a sun gear S2, a carrier CA2, and a ring gear R2.

In the stepped gear shifting unit 218, one gear stage of a plurality of gear stages with different gear ratios γat (=AT input rotation speed Ni_at/AT output rotation speed No_at) is formed by engaging one of a plurality of engagement devices. In this embodiment, a gear stage which is formed in the stepped gear shifting unit 218 is referred to as an AT gear stage. The AT input rotation speed Ni_at is an input rotation speed of the stepped gear shifting unit 218 and has the same value as the rotation speed of the intermediate transmission member 228 and the same value as the MG2 rotation speed Nm. The AT output rotation speed No_at is a rotation speed of the output shaft 220 which is an output rotation speed of the stepped gear shifting unit 218 and is also an output rotation speed of a composite transmission 238 which is a combined transmission including the stepless gear shifting unit 216 and the stepped gear shifting unit 218.

In the stepped gear shifting unit 218, for example, as illustrated in an engagement operation table of FIG. 12, four forward AT gear stages including a first AT gear stage ("1st" in the drawing) to a fourth AT gear stage ("4th" in the drawing) are formed as a plurality of AT gear stages. The gear ratio γat of the first AT gear stage is the highest and the gear ratio γat becomes lower in a higher AT gear stage. A reverse AT gear stage ("Rev" in the drawing) is formed, for example, by engagement of the clutch C1 and engagement of the brake B2. That is, for example, the first AT gear stage is formed at the time of reverse travel as will be described later. The engagement operation table illustrated in FIG. 12 is obtained by collecting relationships between the AT gear stages and the operation states of the plurality of engagement devices. In FIG. 12, "O" denotes engagement, "A" denotes engagement at the time of engine braking or at the time of coast downshift of the stepped gear shifting unit 218, and a blank denotes disengagement.

In the stepped gear shifting unit 218, an AT gear stage which is formed according to a driver's operation of an accelerator, a vehicle speed V, or the like is switched, that is, a plurality of AT gear stages are selectively formed, by an electronic control unit 240 which will be described later. For example, in gear shifting control of the stepped gear shifting unit 218, so-called clutch-to-clutch gear shifting in which gear shifting is performed by switching one of the engagement devices CB, that is, gear shifting is performed by switching of the engagement device CB between engagement and disengagement, is performed. In this embodiment, for example, downshift from the second AT gear stage to the first AT gear stage is referred to as 2→1 downshift. The same is true of another upshift or downshift.

The vehicle 200 further includes a one-way clutch F0. The one-way clutch F0 is a lock mechanism that can fix the carrier CA0 in a non-rotatable manner. That is, the one-way clutch F0 is a lock mechanism that can fix the connection shaft 226 which is connected to the crankshaft of the engine 202 and which rotates integrally with the carrier CA0 to the case 214. In the one-way clutch F0, one member of two members rotatable relative to each other is integrally connected to the connection shaft 226 and the other member is integrally connected to the case 214. The one-way clutch F0 idles in a forward rotating direction which is a rotating direction at the time of operation of the engine 202 and is automatically engaged in a reverse rotating direction which is opposite to that at the time of operation of the engine 202. Accordingly, at the time of idling of the one-way clutch F0, the engine 202 is rotatable relative to the case 214. On the other hand, at the time of engagement of the one-way clutch F0, the engine 202 is not rotatable relative to the case 214. That is, the engine 202 is fixed to the case 214 by engagement of the one-way clutch F0. In this way, the one-way clutch F0 permits rotation in the forward rotating direction of the carrier CA0 which is a rotating direction at the time of operation of the engine 202 and prohibits rotation in the reverse rotating direction of the carrier CA0. That is, the one-way clutch F0 is a lock mechanism that can permit rotation in the forward rotating direction of the engine 202 and prohibit rotation in the reverse rotating direction of the engine 202.

The vehicle 200 further includes an electronic control unit 240 which is a controller including a control device for the vehicle 200 associated with control of the engine 202, the first rotary machine MG1, the second rotary machine MG2, and the like. The electronic control unit 240 has the same configuration as the electronic control unit 100 described above in the first embodiment. The electronic control unit 240 is supplied with various signals which are the same as those supplied to the electronic control unit 100. Various command signals which are the same as those output from the electronic control unit 100 are output from the electronic control unit 240. The electronic control unit 240 has functions equivalent to the functions of the engine operating point control unit 104a, the rotary machine output adjusting unit 106a, the region determining unit 110, the SOC determining unit 112, and the travel mode determining unit 114 which are included in the electronic control unit 100. The electronic control unit 240 can realize a control function of curbing a decrease in fuel efficiency, which is the same function as that realized by the electronic control unit 100 described above in the first embodiment.

Figure 13:
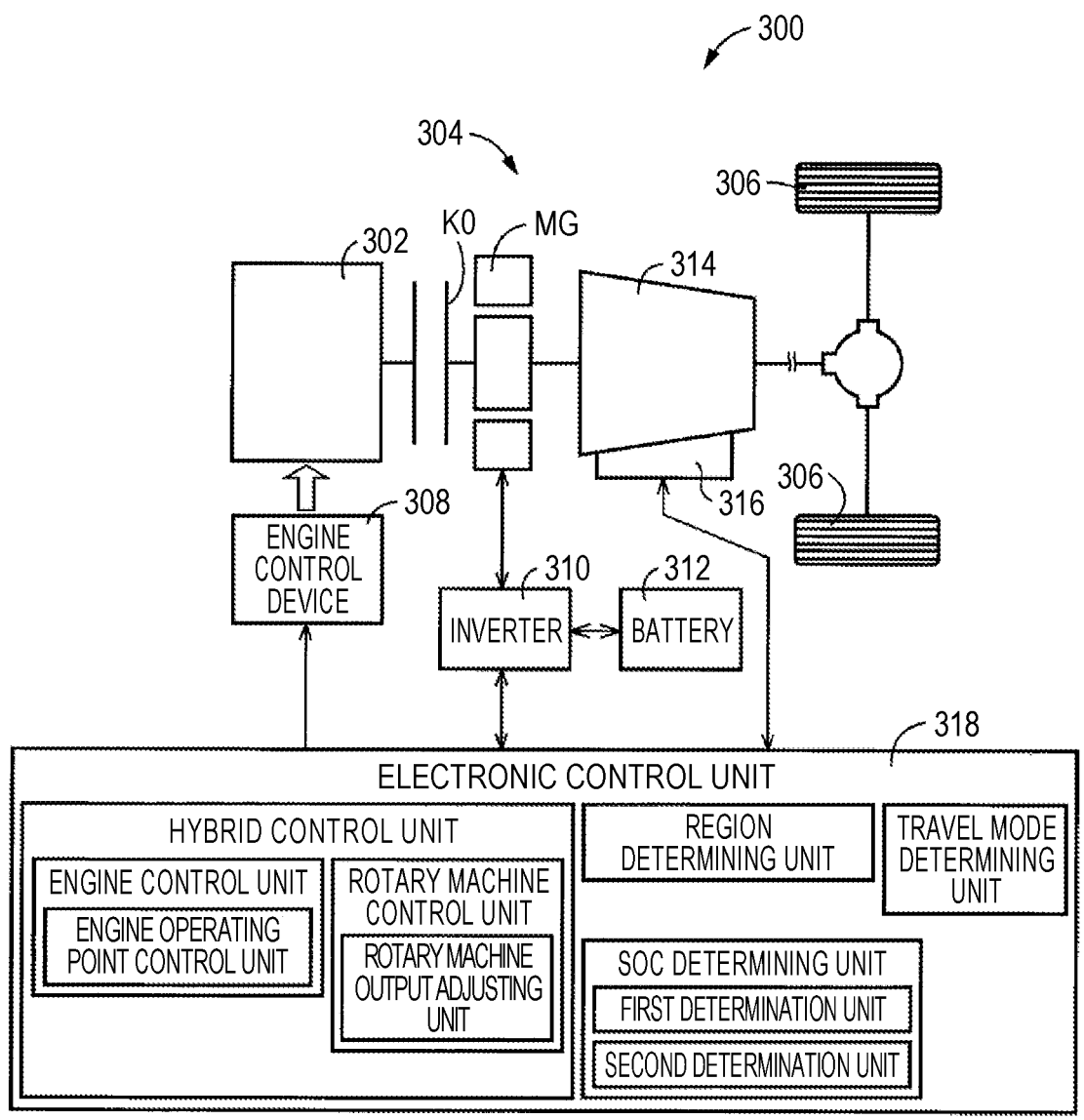
FIG. 13 is a diagram schematically illustrating of a vehicle to which the disclosure is applied and which is different from the vehicle illustrated in FIGS. 1 and 11.

In this embodiment, a vehicle 300 which is different from the vehicle 10 described above in the first embodiment and which is illustrated in FIG. 13 is exemplified. FIG. 13 is a diagram schematically illustrating a configuration of a vehicle 300 to which the disclosure is applied. In FIG. 13, the vehicle 300 is a hybrid vehicle including an engine 302, a rotary machine MG, a power transmission device 304, and driving wheels 306.

The engine 302 has the same configuration as the engine 12 described above in the first embodiment. An engine torque Te of the engine 302 is controlled by causing an electronic control unit (a control device) 318 which will be described later to control an engine control device 308 of an electronic throttle valve, a fuel injection device, an ignition device, and a waste gate valve which are provided in the vehicle 300.

The rotary machine MG is an electric rotary machine having a function of an electric motor and a function of a power generator and is called a motor generator. The rotary machine MG is a rotary machine that is connected to the driving wheels 306 via the power transmission device 304 in a power-transmittable manner. The rotary machine MG is connected to a battery 312 that is a power storage device provided in the vehicle 300 via an inverter 310 provided in the vehicle 300. In the rotary machine MG, an MG torque Tmg which is an output torque of the rotary machine MG is controlled by causing the electronic control unit 318 to control the inverter 310.

The power transmission device 304 includes a clutch KO and an automatic transmission 314. An input rotary member of the automatic transmission 314 is connected to the engine 302 via the clutch KO and is directly connected to the rotary machine MG. In the power transmission device 304, the power of the engine 302 is transmitted to the driving wheels 306 sequentially via the clutch KO, the automatic transmission 314, and the like and the power of the rotary machine MG is transmitted to the driving wheels 306 via the automatic transmission 314 and the like. The engine 302 and the rotary machine MG are drive power sources for travel of the vehicle 300 in which they are connected to the driving wheels 306 in a power-transmittable manner. The automatic transmission 314 is provided in a power transmission path between the rotary machine MG and the driving wheels 306.

The clutch KO is a hydraulic frictional engagement device that connects or disconnects a power transmission path between the engine 302 and the driving wheels 306. For example, similarly to the stepped gear shifting unit 218 described above in the second embodiment, the automatic transmission 314 is a known planetary gear type automatic transmission including a plurality of planetary gear devices or a plurality of engagement devices. In the automatic transmission 314, one gear stage out of a plurality of gear stages is formed by causing a hydraulic pressure control circuit 316 which is provided in the vehicle 300 and which is driven by an electronic control unit 318 which will be described later to adjust engagement hydraulic pressures of the plurality of engagement devices.

The vehicle 300 can perform motor-driven travel with only the rotary machine MG as a power source for travel using electric power from the battery 312 in a state in which the clutch KO is disengaged and the operation of the engine 302 is stopped. The vehicle 300 can perform hybrid travel with at least the engine 302 as a power source for travel by operating the engine 302 in a state in which the clutch KO is engaged.

The vehicle 300 further includes an electronic control unit 318 which is a controller including a control device for the vehicle 300 associated with control of the engine 302, the rotary machine MG, and the like. The electronic control unit 318 has the same configuration as the electronic control unit 100 described above in the first embodiment. The electronic control unit 318 is supplied with various signals which are the same as those supplied to the electronic control unit 100. Various command signals which are the same as those output from the electronic control unit 100 are output from the electronic control unit 318. The electronic control unit 318 has functions equivalent to the functions of the engine operating point control unit 104a, the rotary machine output adjusting unit 106a, the region determining unit 110, the SOC determining unit 112, and the travel mode determining unit 114 which are included in the electronic control unit 100. The electronic control unit 318 can realize a control function of curbing a decrease in fuel efficiency, which is the same as that realized by the electronic control unit 100 described above in the first embodiment.

While embodiments of the disclosure have been described above in detail with reference to the accompanying drawings, the disclosure can be applied to other aspects.

For example, in the first embodiment, the region determining unit 110 determines that the engine operating point OPeng is in the noise generation region SA when the noise duration time T in which the engine operating point OPeng stays in the noise generation region SA is longer than the predetermined time T1, and determines that the engine operating point OPeng is outside of the noise generation region SA when the noise duration time T is equal to or less than the predetermined time T1 and the engine operating point OPeng is in the noise generation region SA. For example, the region determining unit 110 may determine that the engine operating point OPeng is in the noise generation region SA when the engine operating point OPeng is in the noise generation region SA regardless of the noise duration time T.

In the first embodiment, the rotary machine output adjusting unit 106a adjusts the output of the second rotary machine MG2 such that the difference between the engine power Pe and the required engine power Pedem due to the shifting of the engine operating point OPeng by the engine operating point control unit 104a becomes zero, but the output of the second rotary machine MG2 may not be necessarily adjusted such that the difference between the engine power Pe and the required engine power Pedem becomes zero. For example, the output of the second rotary machine MG2 may be adjusted such that the difference between the engine power Pe and the required engine power Pedem decreases.

In the first embodiment, the vehicle 10 may be a vehicle which does not include the gear shifting unit 58 and in which the engine 12 is connected to the differential unit 60 like the vehicle 200. The differential unit 60 may be a mechanism in which a differential operation can be limited by control of a clutch or brake connected to the rotary elements of the second planetary gear mechanism 82. The second planetary gear mechanism 82 may be a double pinion type planetary gear unit. The second planetary gear mechanism 82 may be a differential mechanism including four or more rotary elements by connection between a plurality of planetary gear units. The second planetary gear mechanism 82 may be a differential gear unit in which the first rotary machine MG1 and the drive gear 74 are connected to a pinion which is rotationally driven by the engine 12 and a pair of bevel gears engaging with the pinion, respectively. The second planetary gear mechanism 82 may be a mechanism with a configuration in which two or more planetary gear units are connected to each other via some rotary elements constituting them and the engine, the rotary machines, and the driving wheels are connected to the rotary elements of such planetary gear units in a power-transmittable manner.

In the second embodiment, the one-way clutch F0 is exemplified as a lock mechanism that can fix the carrier CA0 in a non-rotatable manner, but the disclosure is not limited to this aspect. For example, this lock mechanism may be an engagement device such as a mesh type clutch, a hydraulic frictional engagement device such as a clutch or a brake, a dry engagement device, an electromagnetic frictional engagement device, or a magnetic powder type clutch which selectively connects the connection shaft 226 and the case 214. Alternatively, the vehicle 200 does not have to include the one-way clutch F0.

In the second embodiment, the stepped gear shifting unit 218 is exemplified above as an automatic transmission constituting a part of the power transmission path between the differential mechanism 230 and the driving wheels 206, but the disclosure is not limited to this aspect. The automatic transmission may be an automatic transmission such as a synchromesh parallel biaxial automatic transmission, a known dual clutch transmission (DCT) with two input shafts as the synchromesh parallel biaxial automatic transmission, or a known belt type stepless transmission.

In the above embodiments, the supercharger 18 is a known exhaust turbine type supercharger, but the disclosure is not limited thereto. For example, the supercharger 18 may be a mechanical pump type supercharger which is rotationally driven by an engine or an electric motor. An exhaust turbine type supercharger and a mechanical pump type supercharger may be provided together as a supercharger. In the above embodiments, the engine 12 with the supercharger 18 is used, but the engine 12 does not have to include the supercharger 18.

The above embodiments are merely exemplary and the disclosure can be embodied in various forms which have been subjected to various modifications and improvements based on knowledge of those skilled in the art.

What is claimed is:

1. A control device for a hybrid vehicle including an engine and a rotary machine as drive power sources for travel, the control device comprising:
   an engine operating point control unit configured to control an operating point of the engine such that the operating point of the engine reaches an operating point on a predetermined optimal fuel-efficiency operating line based on a required output required of the engine and to shift the operating point of the engine to an operating point on the optimal fuel-efficiency operating line outside a predetermined region in which combustion sounds of the engine become noise when the operating point of the engine is in the predetermined region; and
   a rotary machine output adjusting unit configured to adjust an output of the rotary machine to compensate for a difference between an output of the engine and the required output due to the shift of the operating point of the engine.

2. The control device for the hybrid vehicle according to claim 1, wherein the hybrid vehicle includes a plurality of travel modes including a fuel efficiency priority mode in which priority is given to an increase in fuel efficiency, and
   wherein the engine operating point control unit is configured to shift the operating point of the engine to an operating point on the optimal fuel-efficiency operating line outside the region when the operating point of the engine is in the region and the fuel efficiency priority mode is selected as the travel mode and to shift the operating point of the engine to an operating point on an engine rotation speed contour line in which an engine rotation speed is the same as an engine rotation speed of an operating point in the region outside the region when the fuel efficiency priority mode is not selected as the travel mode.

3. The control device for the hybrid vehicle according to claim 1, wherein the hybrid vehicle includes a power storage device that transmits and receives electric power to and from the rotary machine, and
   wherein the engine operating point control unit is configured to shift the operating point of the engine to an operating point on a side on which the output of the engine is increased outside the region when the operating point of the engine is in the region and a state of charge value of the power storage device is equal to or less than a predetermined lower-limit threshold value.

4. The control device for the hybrid vehicle according to claim 1, wherein the hybrid vehicle includes a power storage device that transmits and receives electric power to and from the rotary machine, and
   wherein the engine operating point control unit is configured to shift the operating point of the engine to an operating point on a side on which the output of the engine is decreased outside the region when the operating point of the engine is in the region and a state of charge value of the power storage device is equal to or greater than a predetermined upper-limit threshold value.

5. The control device for the hybrid vehicle according to claim 1, wherein the engine operating point control unit is configured to shift the operating point of the engine to an operating point on the optimal fuel-efficiency operating line outside the region when a noise duration time in which the operating point of the engine stays in the region is longer than a predetermined time which is determined in advance and to control the operating point of the engine such that the operating point of the engine reaches an operating point on the optimal fuel-efficiency operating line based on the required output when the noise duration time is equal to or shorter than the predetermined time.

* * * * *